United States Patent [19]

Suzuki et al.

[11] 4,378,234
[45] Mar. 29, 1983

[54] PARTICULATE MATERIAL COLLECTING APPARATUS

[75] Inventors: Takeshi Suzuki; Mikio Murao; Masaharu Takagishi; Kiyoshi Aizawa, all of Kobe, Japan

[73] Assignee: Kawasaki Jukogyo Kabushiki Kaisha, Kobe, Japan

[21] Appl. No.: 266,572

[22] Filed: May 22, 1981

Related U.S. Application Data

[63] Continuation-in-part of Ser. No. 97,061, Nov. 23, 1979, abandoned.

[30] Foreign Application Priority Data

Dec. 7, 1978 [JP] Japan .............................. 53-152162
Apr. 13, 1979 [JP] Japan ................................ 54-44841

[51] Int. Cl.$^3$ ...................... B01D 45/12; B01D 46/48; B04C 3/06
[52] U.S. Cl. ........................................ 55/338; 55/397; 55/398; 55/399; 55/423; 55/427; 55/431; 55/457; 55/459 B; 55/460; 34/57 E; 209/144
[58] Field of Search ................... 55/397–399, 55/423, 426, 459 B, 460, 461, 466, 338, 427, 431–433, 457, 459 R; 209/144; 34/57 E

[56] References Cited

U.S. PATENT DOCUMENTS

| | | | |
|---|---|---|---|
| 390,100 | 9/1888 | Smith | 209/144 |
| 458,147 | 8/1891 | Kimble | 55/397 |
| 837,705 | 12/1906 | Morse | 55/459 B |
| 1,620,241 | 3/1927 | Stebbins | 55/397 |
| 1,953,948 | 4/1934 | Bieth | 55/459 R |
| 2,373,969 | 4/1945 | Lincoln | 55/397 |
| 2,441,631 | 5/1948 | Hills | 55/338 |
| 2,643,734 | 6/1953 | Rowell | 55/427 |
| 2,770,322 | 11/1956 | Banham, Jr. et al. | 55/397 |
| 2,973,094 | 2/1961 | Lundy | 209/144 |
| 2,989,146 | 6/1961 | Lundy | 55/397 |
| 3,426,513 | 2/1969 | Bauer | 55/459 R |
| 3,535,854 | 10/1970 | Taylor | 55/457 |
| 3,577,711 | 5/1971 | De Bernardo | 55/399 |
| 3,710,558 | 1/1973 | Feder | 55/338 |
| 3,724,181 | 4/1973 | Benson, Jr. | 55/459 B |
| 4,198,290 | 4/1980 | Summers | 55/459 R |
| 4,285,142 | 8/1981 | Suzuki et al. | 209/144 |

FOREIGN PATENT DOCUMENTS

| | | | |
|---|---|---|---|
| 686367 | 12/1939 | Fed. Rep. of Germany | 55/397 |
| 974442 | 12/1960 | Fed. Rep. of Germany | 55/459 B |
| 120673 | 1/1948 | Sweden | 55/461 |
| 571222 | 8/1945 | United Kingdom | 55/397 |
| 285480 | 1/1971 | U.S.S.R. | 55/338 |
| 430870 | 6/1975 | U.S.S.R. | 209/144 |
| 655406 | 4/1979 | U.S.S.R. | 55/459 R |

Primary Examiner—David L. Lacey
Attorney, Agent, or Firm—Jordan and Hamburg

[57] ABSTRACT

A particulate material collecting apparatus including a cylindrical member defining therein a spiral flow chamber for forming a spiral flow of gas therein, an inlet duct and an outlet duct connected to the cylindrical member tangentially to the inner circumferential surface thereof, and a hollow inverted pyramidical member secured to the lower portion of the cylindrical member. A spiral flow guide plate having a convex surface curved radially outwardly of the cylindrical member is interposed between the cylindrical member and the inverted pyramidical member. The spiral flow guide plate is positioned so as to define two openings, one opening being located on the upstream side of the spiral flow of gas and the other opening being located on the downstream side of the spiral flow of gas. The spiral flow of gas is introduced from the spiral flow chamber through the upstream side opening into a material collecting space defined between an inner wall portion of the inverted pyramidical member and a collected material guide plate secured to the spiral flow guide plate to extend parallel to the inner wall portion, so that particulate material incorporated in the spiral flow of gas is separated by inertia from the gas and collected in the inverted pyramidical member.

20 Claims, 46 Drawing Figures

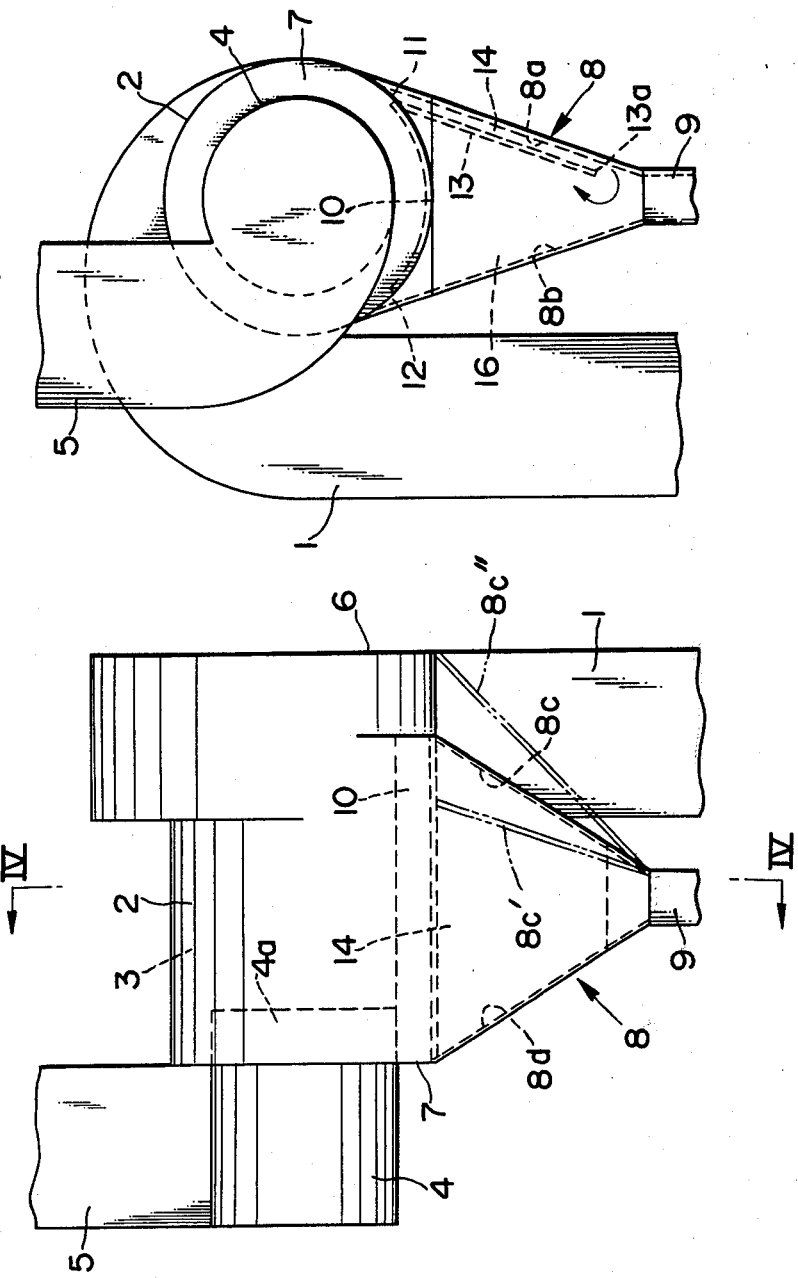

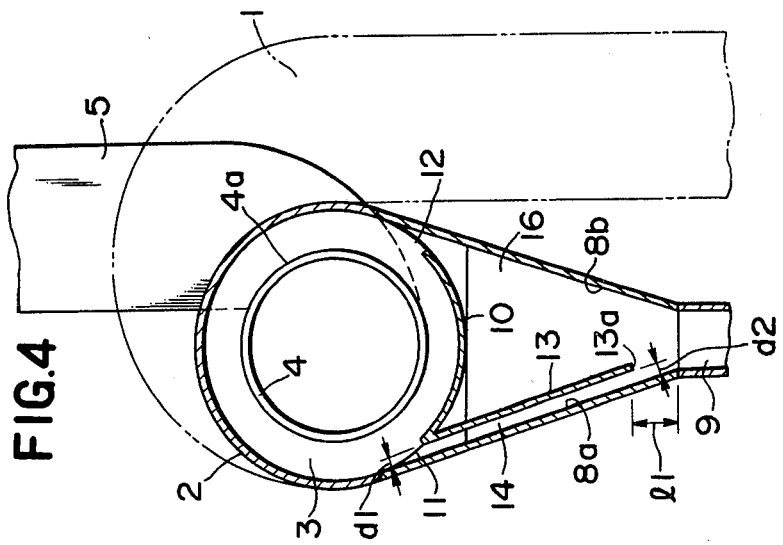
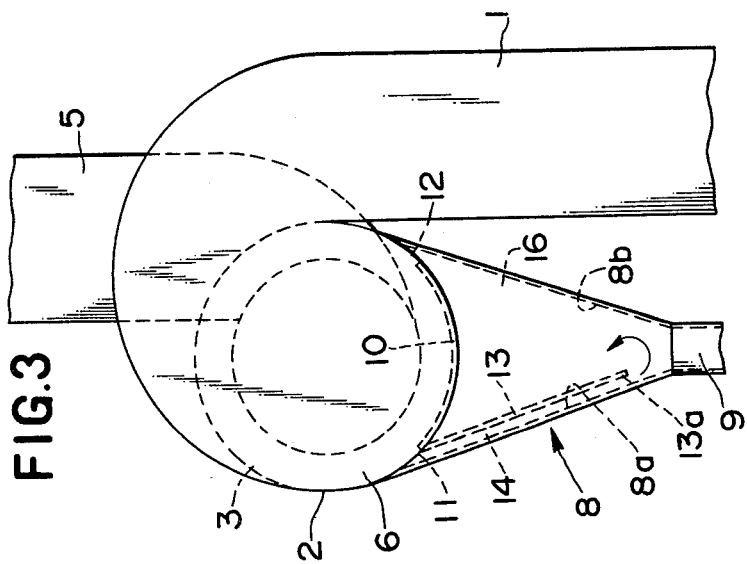

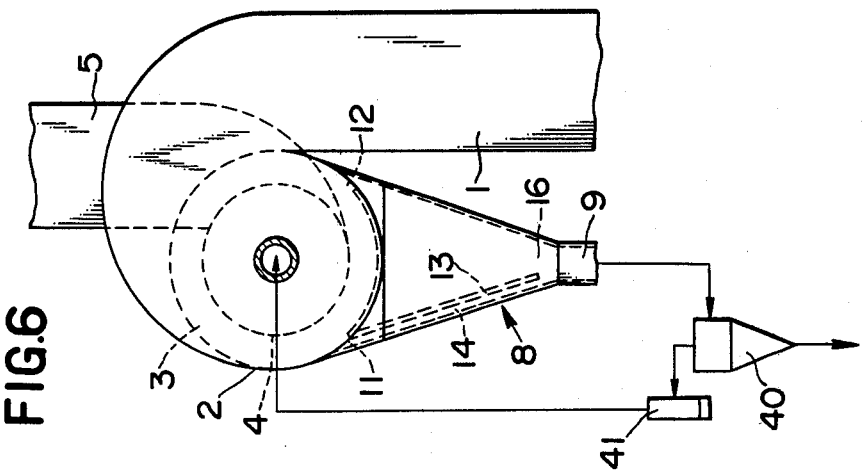
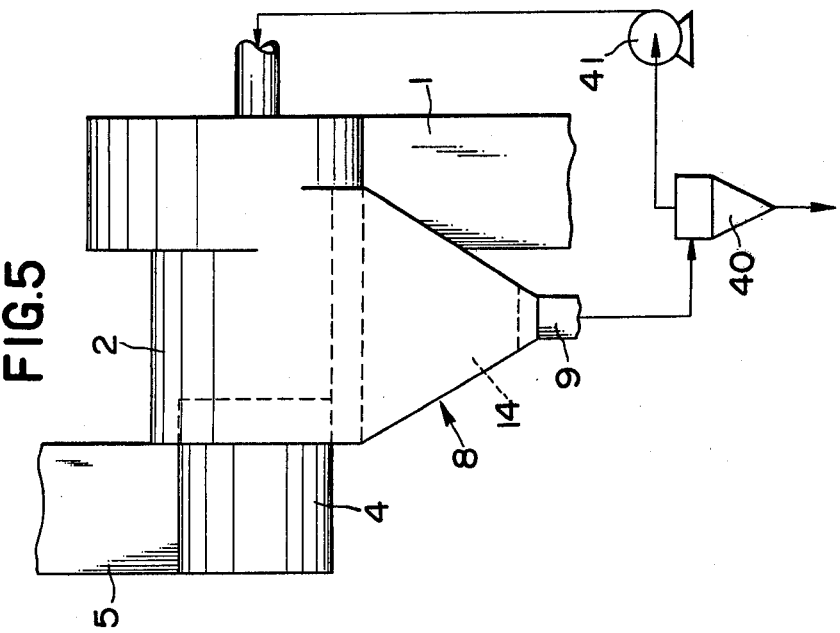

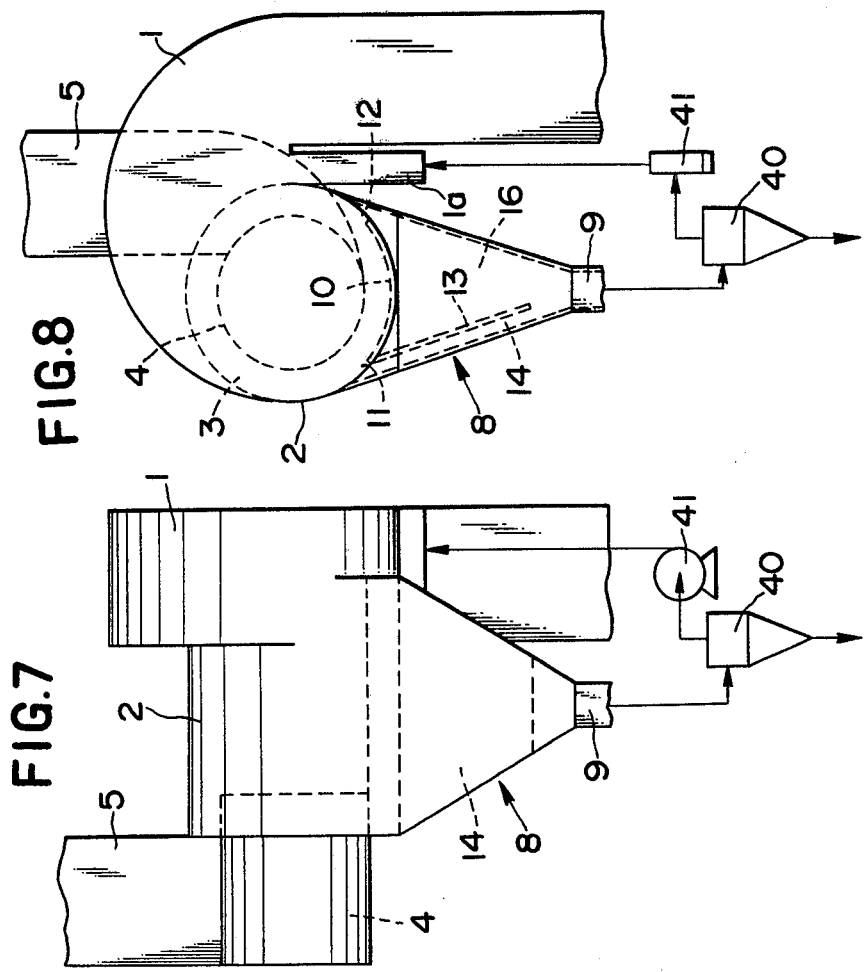

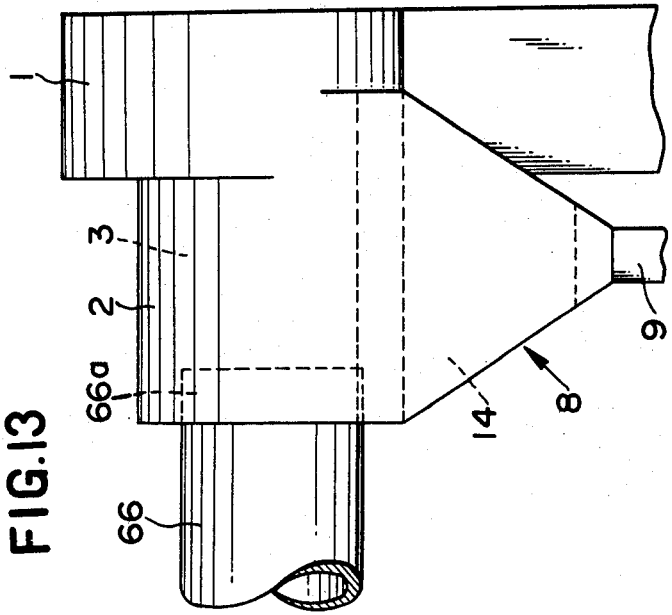
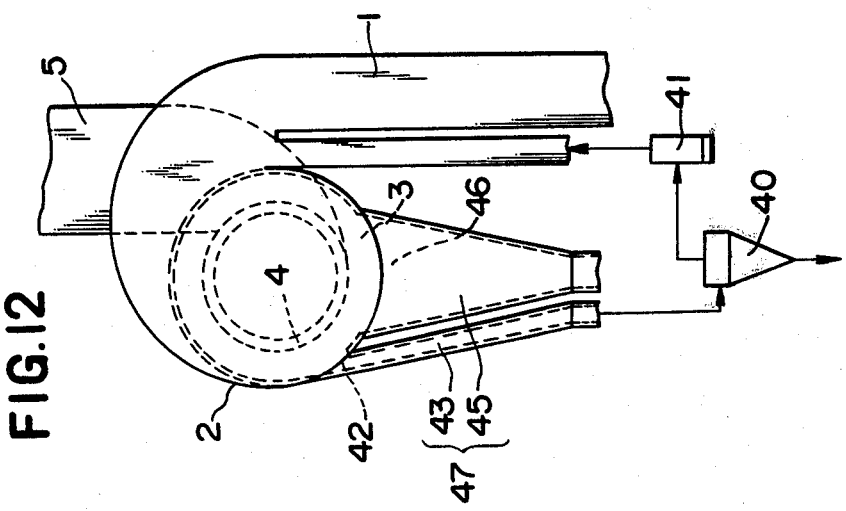

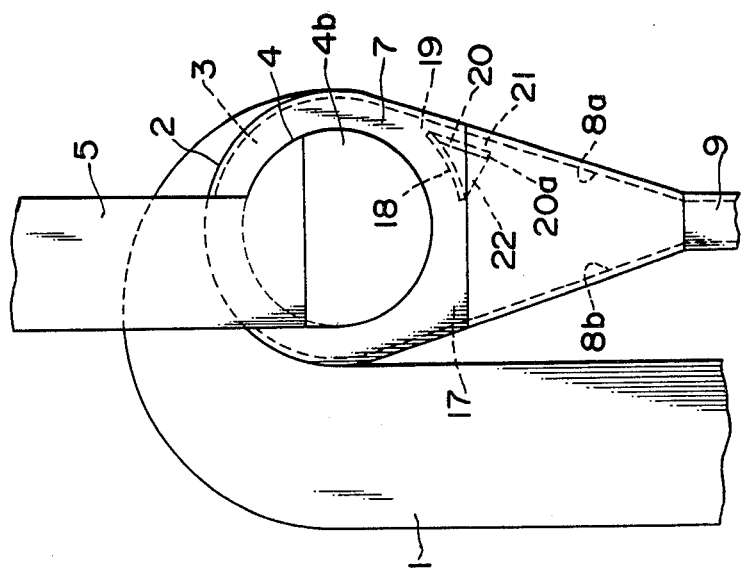
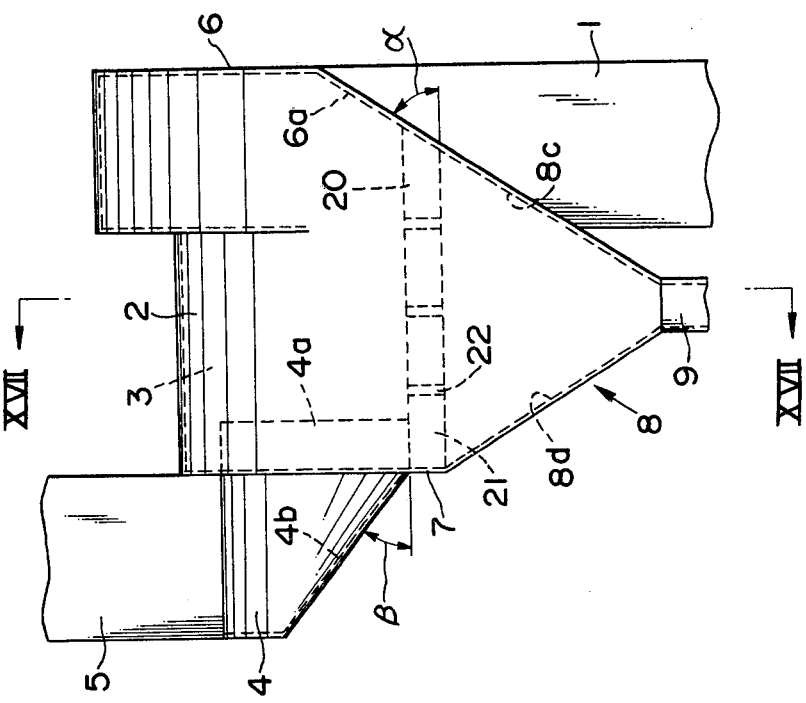

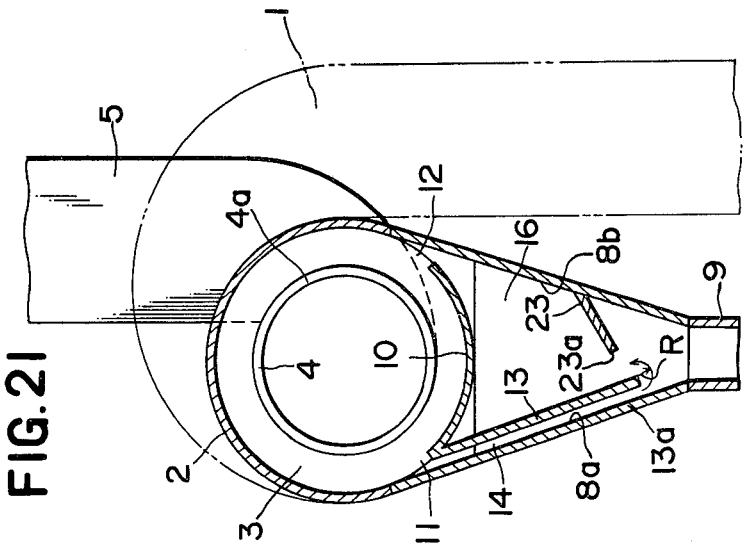
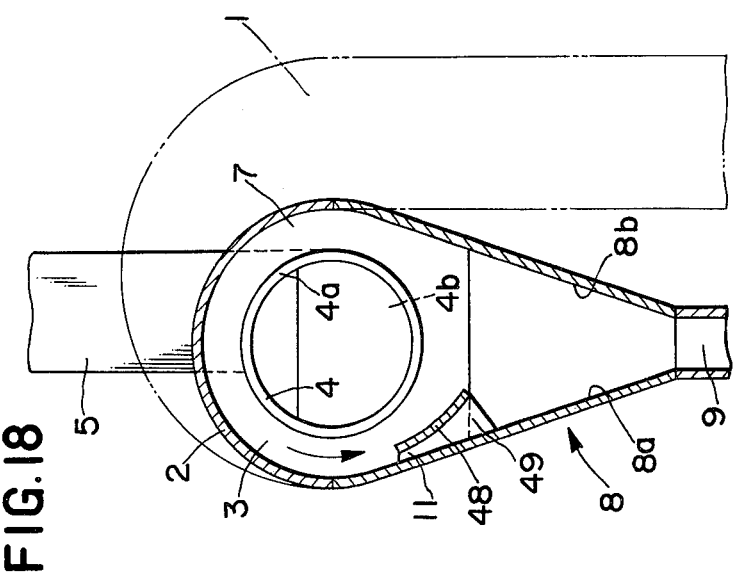

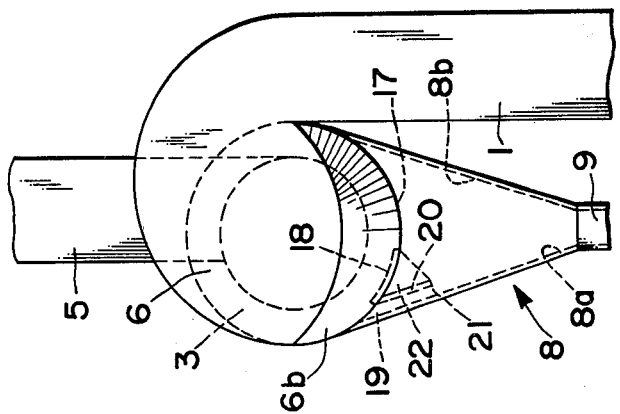
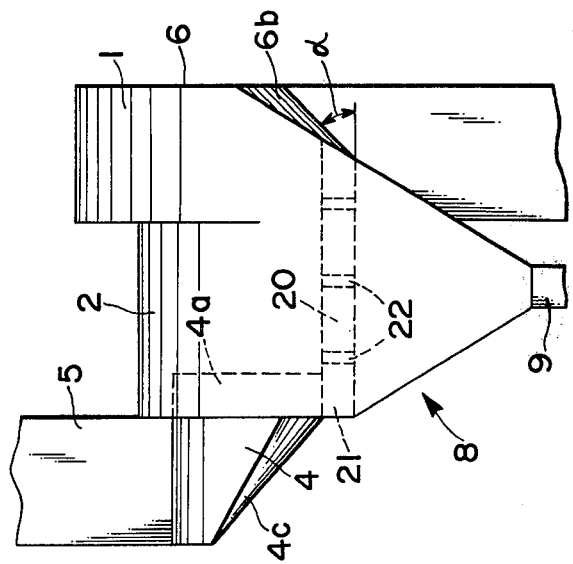

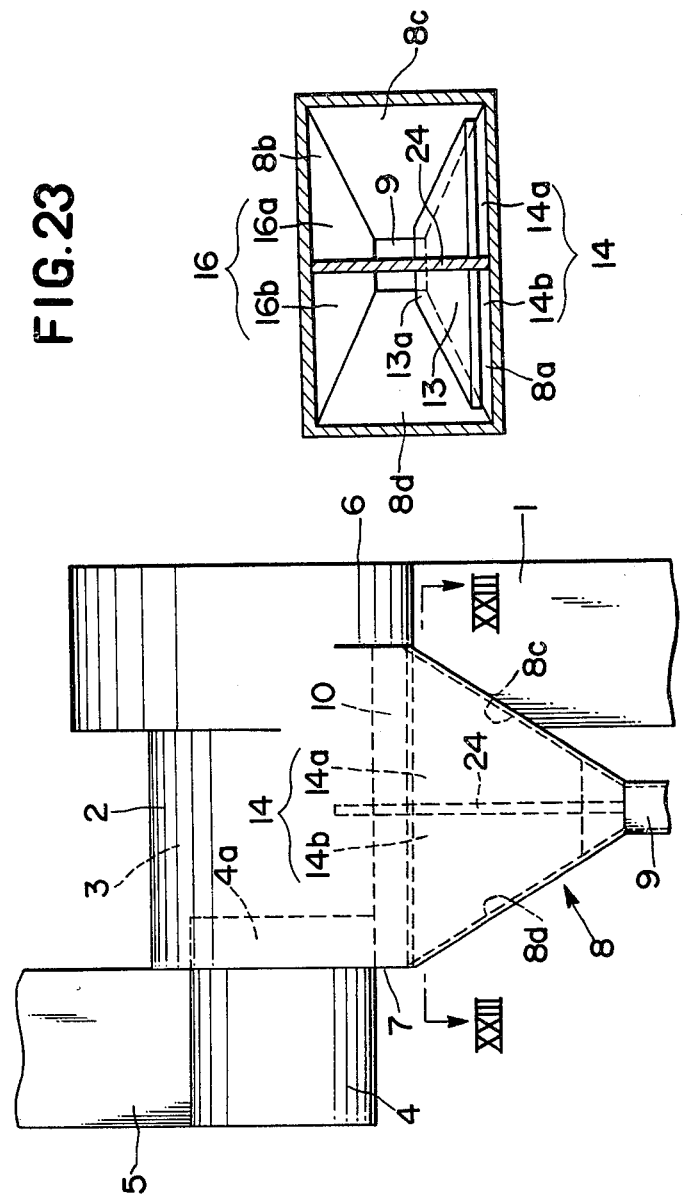

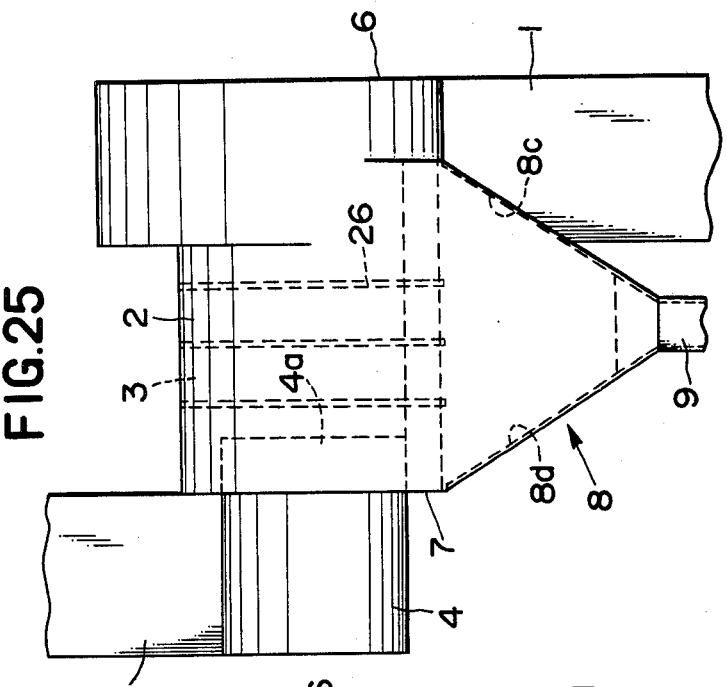
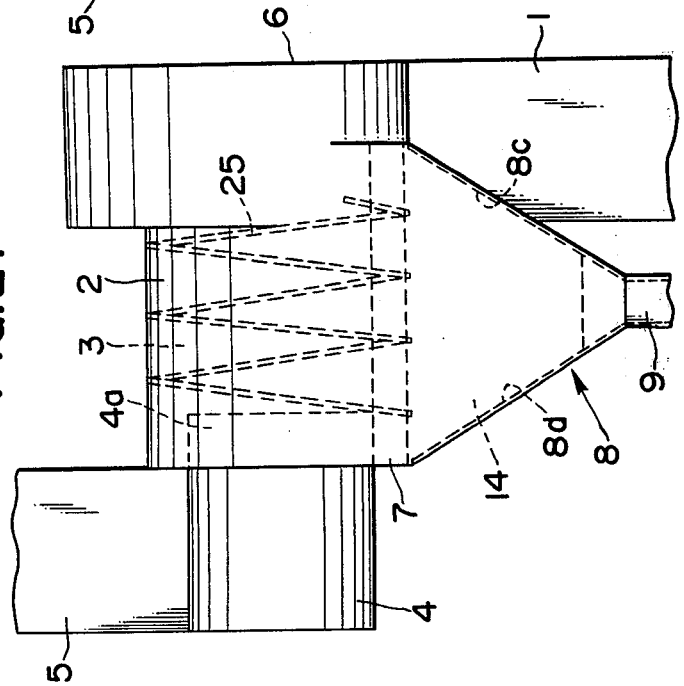

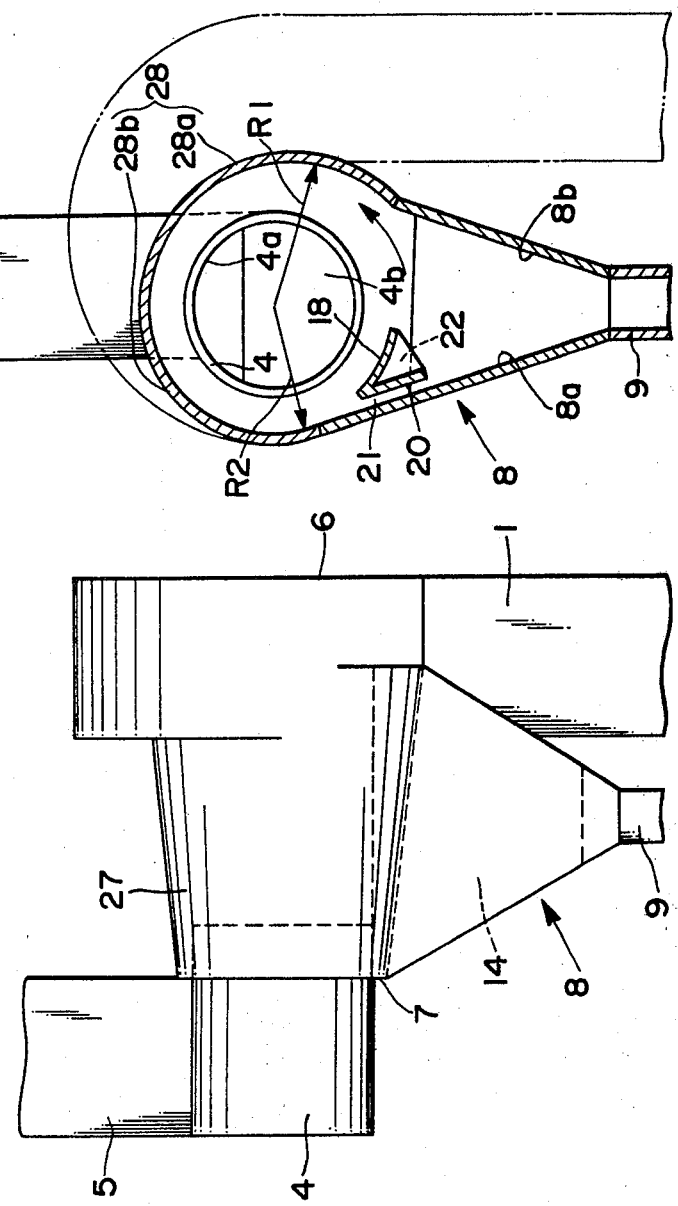

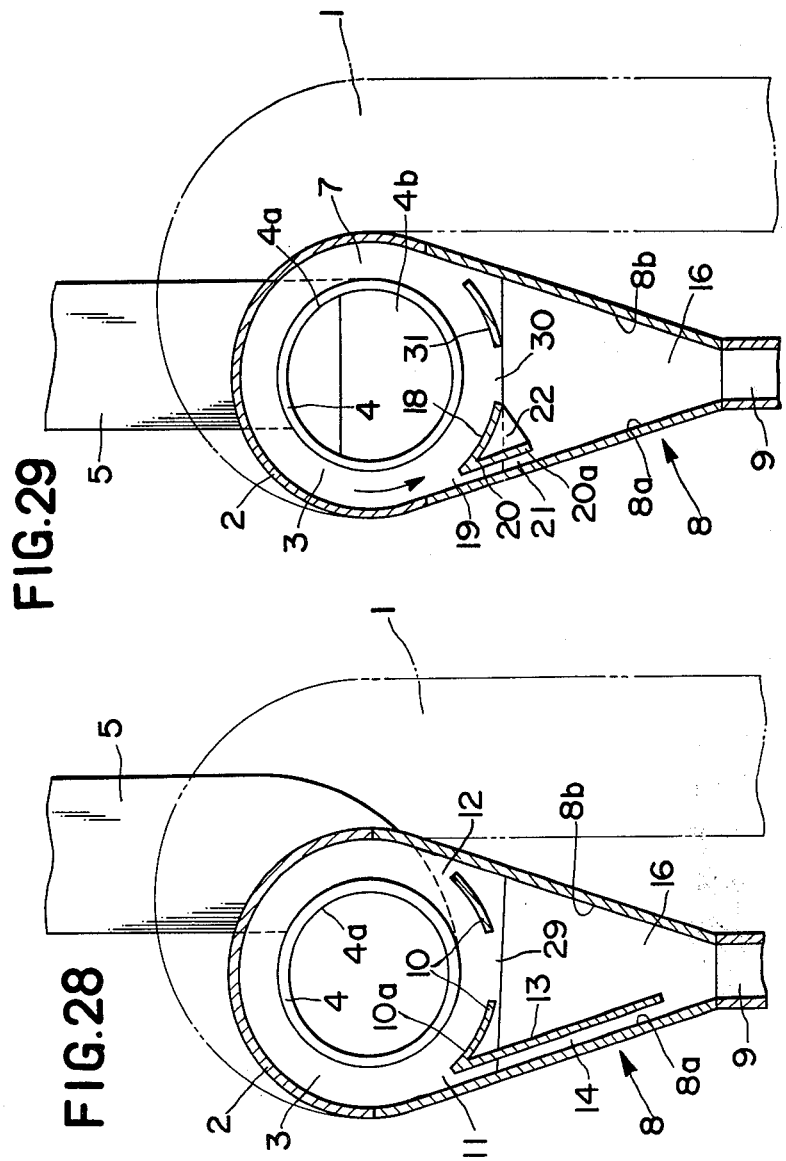

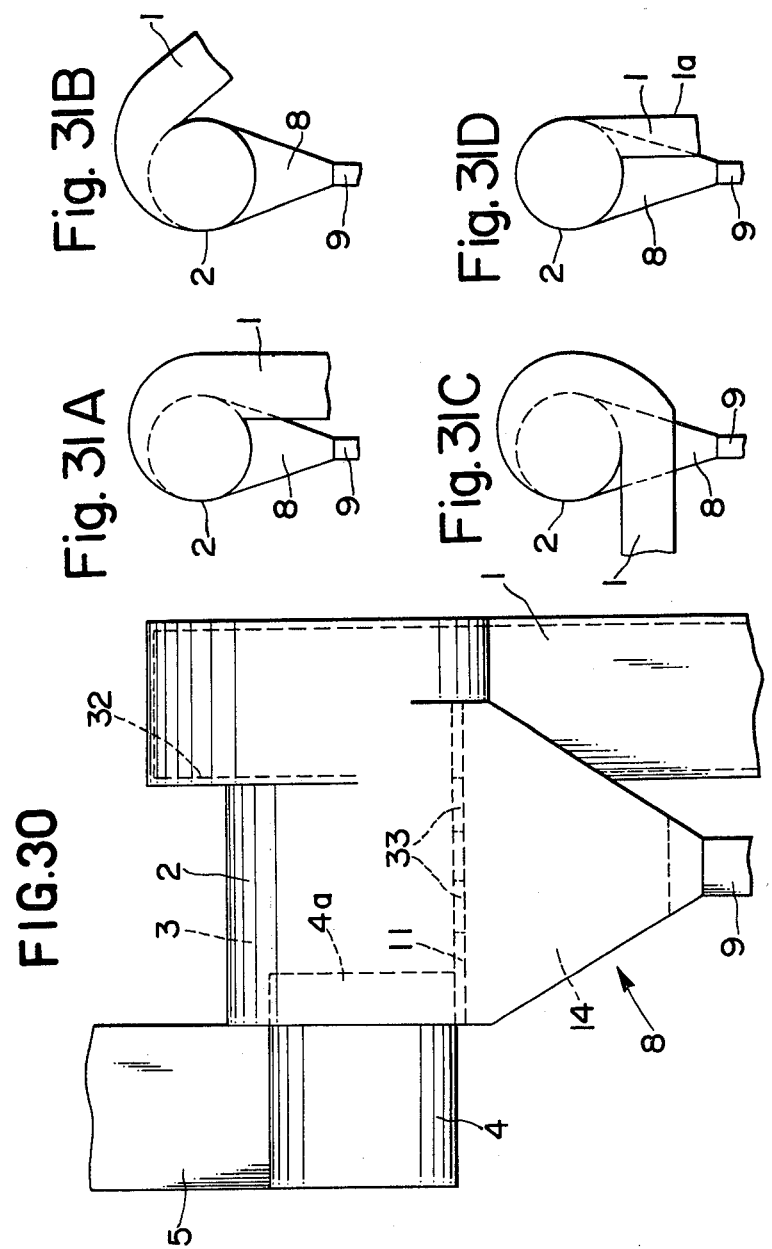

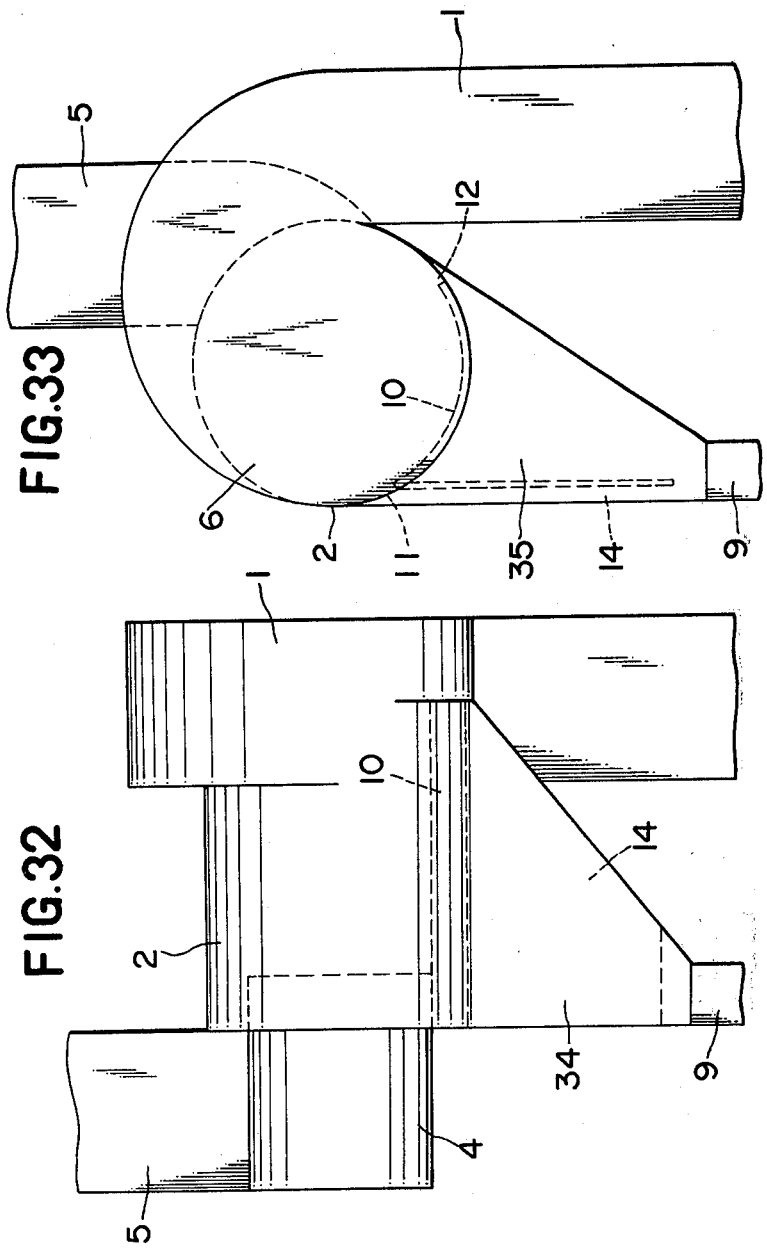

INFLUENCE BY THE LENGTH OF THE SPIRAL FLOW CHAMBER $L/D$

- L: length of the chamber
- D: inner diameter of the chamber

INFLUENCE OF THE LENGTH OF THE CYLINDRICAL PORTION $l/D$

- l: length of the portion
- D: inner diameter of the chamber

INFLUENCE OF THE DIAMETER  
OF THE CYLINDRICAL PORTION $d/D$ $\begin{cases} d: \text{inner diameter of the portion} \\ D: \text{inner diameter of the chamber} \end{cases}$

PARTICULATE MATERIAL COLLECTING APPARATUS

REFERENCE TO RELATED APPLICATION

This is a continuation-in-part of application Ser. No. 97,061 filed Nov. 23, 1979, now abandoned.

BACKGROUND OF THE INVENTION

This invention relates to a particulate material collecting apparatus.

Cyclones have hitherto been most popular as particulate material collecting apparatus. In cyclones, two types of vortical flows, i.e. forced vortical flow and semi-free vortical flow are formed, and the two types of vortical flows interfere with each other to cause a loss in pressure. To minimize mutual interference of the two types of vortical flows for reducing pressure loss requires an increase in the size of the apparatus which entails an increase in capital and operating cost.

SUMMARY OF THE INVENTION

This invention has as its object the provision of a particulate material collecting apparatus capable of collecting particulate material with a high degree of efficiency without an increase in pressure loss in spite of its size being small.

The aforementioned object of the invention is accomplished by providing a particulate material collecting apparatus comprising a cylindrical member having a horizontal center axis, an inlet duct and an outlet duct connected to the cylindrical member in a manner to extend tangentially to the inner circumferential surface of the cylindrical member, and a hollow inverted pyramidical member secured to the lower portion of the outer circumferential surface of the cylindrical member, the inverted pyramidical member having a plurality of inner wall portions including a first inner wall portion extending outwardly tangentially to the inner wall surface of the cylindrical member. A spiral flow guide plate is mounted between the cylindrical member and the inverted pyramidical member and shaped as a convex surface extending radially outwardly of the cylindrical member. The spiral flow guide plate is formed with two openings, one opening located on the upstream side of a spiral flow formed in the cylindrical member and the other opening located on the downstream side thereof. A collected material guide plate located in the inverted pyramidical member and connected to the spiral flow guide plate extends parallel to the first inner wall portion of the inverted pyramidical member to define a material collecting space communicating with the cylindrical member through the opening on the upstream side of the spiral flow. The particulate material collecting apparatus according to the present invention is high in the efficiency of collecting particulate material, small in size and low in pressure loss.

BRIEF DESCRIPTION OF THE DRAWINGS

FIG. 1 is a schematic front view of the particulate material collecting apparatus comprising one embodiment of the present invention;

FIG. 2 is a side view of the apparatus as seen from left in FIG. 1;

FIG. 3 is a side view of the apparatus as seen from right in FIG. 1;

FIG. 4 is a sectional view taken along the line IV—IV in FIG. 1;

FIG. 5 is a schematic front view of the particulate material collecting apparatus comprising another embodiment of the invention;

FIG. 6 is a side view of the apparatus as seen from the right in FIG. 5;

FIG. 7 is a schematic front view of the particulate material collecting apparatus comprising still another embodiment of the invention;

FIG. 8 is a side view of the apparatus as seen from the right in FIG. 7;

FIG. 12 is a side view of the particulate material collecting apparatus comprising still another embodiment of the invention;

FIG. 13 is a schematic front view of the particulate material collecting apparatus comprising still another embodiment of the invention;

FIG. 14 is a schematic front view of the particulate material collecting apparatus comprising still another embodiment of the invention;

FIG. 15 is a schematic side view of the apparatus as seen from the left in FIG. 14.

FIG. 18 is a schematic sectional view of the particulate material collecting apparatus comprising still another embodiment of the invention;

FIG. 19 is a schematic front view of the particulate material collecting apparatus comprising a further embodiment of the invention;

FIG. 20 is a schematic side view of the apparatus as seen from the right in FIG. 19;

FIG. 21 is a sectional view of the particulate material collecting apparatus comprising a further embodiment of the invention;

FIG. 22 is a schematic front view of the particulate material collecting apparatus comprising a further embodiment of the invention;

FIG. 23 is a schematic sectional view taken along the line XXIII—XXIII in FIG. 22;

FIGS. 24, 25 and 26 are schematic front views of the particulate material collecting apparatus each comprising another embodiment of the invention;

FIGS. 27, 28 and 29 are schematic sectional views of the particulate material collecting apparatus each comprising another embodiment of the invention;

FIG. 30 is a schematic front view of the particulate material collecting apparatus comprising a further embodiment of the invention;

FIGS. 31A, 31B, 31C and 31D are schematic side views of the particulate material collecting apparatus comprising further embodiments of the invention;

FIG. 32 is a schematic front view of the particulate material collecting apparatus comprising a further embodiment of the invention;

FIG. 33 is a schematic side view of the particulate material collecting apparatus comprising a further embodiment of the invention;

DESCRIPTION OF THE PREFERRED EMBODIMENTS

Figure 9:
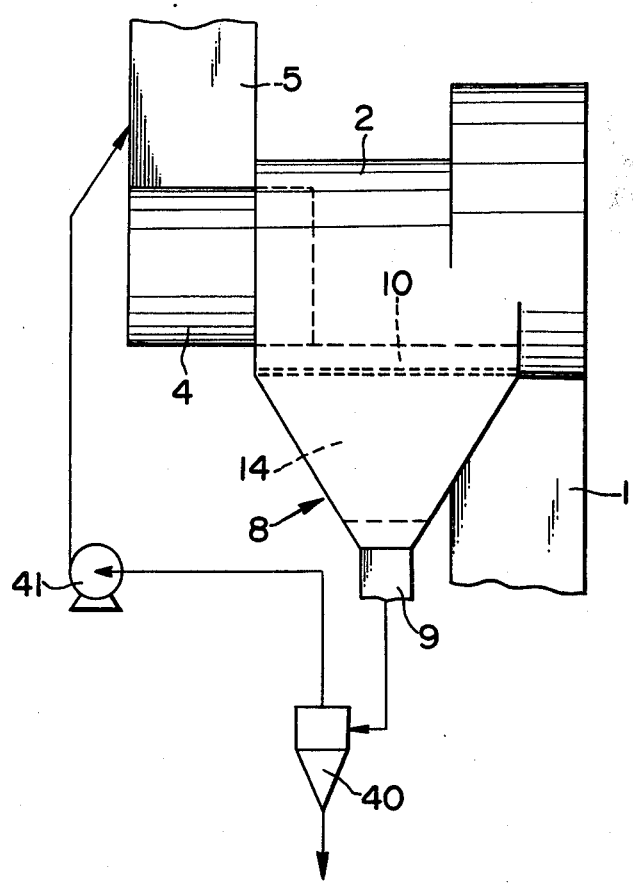
FIG. 9 is a schematic sectional view of the particulate material collecting apparatus comprising still another embodiment of the invention.

Preferred embodiments of the present invention will now be described by referring to the drawings.

FIGS. 1 to 4 show one embodiment wherein an inlet duct 1 extending vertically for introducing into the apparatus a gas stream having incorporated therein particulate material to be collected is connected to a cylindrical member 2 at one end thereof (right end in FIG. 1) in a manner to extend tangentially to the inner circumferential surface of the cylindrical member 2. The cylindrical member 2 has a horizontal center axis and defines therein a spiral flow chamber 3 circular in cross section. A cylindrical portion 4 smaller in diameter than the cylindrical member 2 is connected to the other end (left end in FIG. 1) of the cylindrical member 2 substantially coaxially with each other and has an outlet duct 5 connected thereto and directed upwardly tangentially to the inner circumferential surface of the cylindrical portion 4. The cylindrical member 2 is closed by end walls 6 and 7 at its opposite ends.

The cylindrical member 2 has a hollow inverted pyramidical member 8 extending along the entire length of the cylindrical member 2, which is connected to the lower portion of the outer circumferential surface of the cylindrical member 2. The inverted pyramidical member 8 has a first inner wall portion 8a extending obliquely downwardly tangentially to the circumferential surface of the spiral flow chamber 3, a second inner wall portion 8b disposed in spaced juxtaposed relation to the first inner wall portion 8a and extending obliquely downwardly tangentially to the circumferential surface of the spiral flow chamber 3, the first and second wall portions 8a and 8b nearing toward each other in going downwardly, and a third inner wall portion 8c and a fourth inner wall portion 8d disposed at right angles to the first and second inner wall portions 8a and 8b and in spaced juxtaposed relation to each other to extend obliquely downwardly toward each other. The inverted pryamidical member 8 has a material collecting cylinder 9 connected to its lower end.

Located at the upper end of the inverted pyramidical member 8 and extending along the entire length of the cylindrical member 2 in a manner to substantially separate the spiral flow chamber 3 from the inner space of the inverted pyramidical member 8 is a spiral flow guide plate 10 which is curved with the same curvature as the wall of the cylindrical member 2 and is disposed on or inside of the circumferential surface of the cylindrical member 2. Openings 11 and 12 are formed between the spiral flow guide plate 10 and the inner circumferential surface of the cylindrical member 2. When the gas is introduced from the duct 1 into the cylindrical member 2 to spirally flow therein, the opening 11 is located at an upstream side and the opening 12 is located at a downstream side of the spiral gas flow to communicate the spiral flow chamber 3 with the interior of the inverted pyramidical member 8. The openings 11 and 12 both extend along the entire length of the cylindrical member 2.

Connected to the spiral flow guide plate 10 is a collected material guide plate 13 extending in the inverted pyramidical member 8 parallel to the first inner wall portion 8a of the inverted pyramidical member 8 to define a material collecting space 14 in the inverted pyramidical member 8 communicating with the spiral flow chamber 3 through the opening 11. The collected material guide plate 13 terminates at its lower end 13a located in spaced juxtaposed relation to the first inner wall portion 8a of the inverted pyramidical member 8 and with a space $l_1$ upwardly away from the lower end of the inverted pyramidical member 8 as shown in FIG. 4. The collected material guide plate 13 extends in the inverted pyramidical member 8 parallel to the axis of the cylindrical member 2 between the third and fourth inner wall portions 8c and 8d. With this collected material guide plate 13 the space 14 communicating with the opening 11 located on the upstream side of the spiral flow and a space portion 16 communicating with the opening 12 located on the downstream side of the spiral flow are formed in the inverted pyramidical member 8.

In operation, a gas stream having incorporated therein particulate material to be collected flows upwardly through the inlet duct 1 and is introduced into the spiral flow chamber 3 in the cylindrical member 2 tangentially thereto. Since the spiral flow guide plate 10 is curved with substantially the same curvature as the wall of the cylindrical member 2, the gas stream introduced into the spiral flow chamber 3 flows spirally in the spiral flow chamber 3 without being disturbed by the spiral flow guide plate 10. The gas stream is discharged from the cylindrical portion 4 through the outlet duct 5 after spirally flowing three times in the chamber 3. The spiral movement of the gas stream causes the pressure near the opening 12 at the downstream side of the spiral flow to be reduced below the pressure near the opening 11 at the upstream side of the spiral flow. As a result, a part of the gas stream spirally flowing in the spiral flow chamber 3 is drawn by suction from the opening 11 to the opening 12 through the material collecting space portion 14 and the space portion 16.

When the gas stream flows spirally in the spiral flow chamber 3, the particulate material incorporated in the gas stream is forced by centrifugal forces to be displaced toward the inner wall surface of the cylindrical member 2. Thus, the particulate material exists in high concentration near the inner wall surface of the cylindrical member 2. A gas stream containing the particulate material in high concentration flows downwardly through the material collecting space portion 14 along the inner wall portion 8a of the inverted pyramidical member 8 which extends outwardly almost tangentially to the inner circumferential surface of the cylindrical member and the collected material guide plate 13 disposed parallel to the inner wall portion 8a. Since the inverted pyramidical member 8 is converging in going downwardly, the gas stream having incorporated therein the particulate material of high concentration has its speed of downward flow increased, so that the particulate material drops by virtue of downwardly directed inertia into the material collecting cylinder 9 with high efficiency, to be eventually discharged from the apparatus. The gas stream flowing downwardly through the material collecting space portion 14 changes its direction of flow near the lower end 13a of the collected material guide plate 13 and flows upwardly through the space portion 16 in the inverted pyramidical member 8. Since the space portion 16 is defined by walls diverging in going upwardly, the speed of upward flow of the gas stream therein is reduced, thereby increasing the efficiency with which the particulate material is collected.

As shown in FIG. 4, the opening 11 has a width d1, which is made relatively large when the particulate material incorporated in the stream of gas introduced into the spiral flow chamber 3 has a relatively high concentration and which is made relatively small when it has a relatively low concentration. By this arrangement, it is possible to reduce as much as possible the volume of the stream of gas introduced into the material collecting space 14 to increase the concentration of the particulate material in the stream of gas introduced into the material collecting space 14, to thereby increase the efficiency with which the particulate material is collected in the inverted pyramidical member 8.

The cylindrical portion 4 has an end portion 4a projecting into the spiral flow chamber 3, thereby preventing a gas stream containing particulate material in high concentration from being drawn into the cylindrical portion 4. The end portion 4a may be in conical form converging widened or narrowed toward the end opposed to the cylindrical member 2.

In the embodiment shown and described hereinabove, the particulate material incorporated in the gas stream is forcedly led to the material collecting space portion 14 to be separated from the gas stream. This enables the particulate material collecting apparatus according to the present invention to be reduced in size as compared with cyclones of the prior art wherein particulate material is separated from the gas stream by causing the particulate material to move downwardly by gravity. Moreover, in the particulate material collecting apparatus according to the invention, no semi-free vortical motion is produced near the center axis of the cylindrical member 2 as happens in the cyclones, so that it is possible to reduce the inner diameter of the cylindrical member 2. In the spiral flow chamber 3 in the cylindrical member 2, the gas flows axially of the chamber while circling around the center axis of the chamber. The absence of interference between two types of vortical flows that happens in the cyclones minimizes a power loss in the spiral flow chamber 3. The outlet duct 5 is connected, through the cylindrical portion 4, to the cylindrical member 2 tangentially to the spiral gas flow in the cylindrical member 2, so that the gas can be smoothly discharged from the spiral flow chamber 3 and the pressure loss can be further reduced. In the outlet duct 5, the gas stream flows in a straight line without spirally circling. Thus, when particulate material is introduced into the outlet duct 5 to cause heat exchange to take place between the particulate material and gas while they flow in countercurrents (in the embodiments shown in FIGS. 36 and 37, for example), the particulate material tends to be uniformly distributed in the outlet duct 5, thereby increasing the efficiency with which heat exchange is effected.

In the embodiment shown in FIGS. 1-4, the first inner wall portion 8a of the inverted pyramidical member 8 is disposed parallel to the collected material guide plate 13 to increase the speed at which the stream of gas flows downwardly in the material collecting space 14. If the speed of downward flow of the stream of gas is too high, then the resistance offered to the downward flow of the gas will be increased and difficulties will be experienced in introducing the gas into the material collecting space 14, or the particulate material will not drop into the material collecting cylinder 9 but will disperse again in the upper portion of the space 16 as the gas stream changes its direction of flow at the lower end 13a of the collected material guide plate 13. To avoid these troubles, a gap d2 (See FIG. 4) between the lower end 13a of the collected material guide plate 13 and the first inner wall portion 8a may be increased in size wider than the width d1 of the opening 11, to thereby regulate the speed of downward flow of the gas stream.

In another embodiment, the length of the collected material guide plate 13 may be reduced in such a manner that the space between the lower end 13a of the plate 13 and the lower end portion of the inverted pyramidical member 8 is greater than the space $l_1$ of the embodiment shown in FIGS. 1-4, so that the lower end 13a will be located in the upper portion of the inverted pyramidical member 8. In addition, the invention is not limited to the center axis of the cylindrical member 2 being horizontal, and the center axis thereof may be inclined depending on the position in which the apparatus is installed. The third inner wall portion 8c may be arranged as indicated at 8c' and 8c" in dash-and-dot lines in FIG. 1.

Another embodiment of the invention is shown in a front view in FIG. 5 and in a right side view in FIG. 6. In FIGS. 5 and 6, parts similar to those shown in FIGS. 1 to 4 are designated by like reference characters. The embodiment shown in FIGS. 5 and 6 is essentially similar to the embodiment shown in FIGS. 1 to 4 and has a material collecting means 40, such as a cyclone, connected to the material collecting cylinder 9. Part of the gas flowing downwardly through the material collecting space portion 14 is introduced by an induction blower 41 into the material collecting means 40. This reduces the amount of the particulate material in the gas returned from the space portion 16 to the spiral flow chamber 3 through the opening 12. The gas free from particulate material introduced into the material collecting means 40 is blown by the induction blower 41 into the spiral flow chamber 3 through the end of the cylindrical member 2 to which the inlet duct 1 is connected, to flow axially of the cylindrical member 2 toward the cylindrical portion 4. Introduction of the material-free gas into the spiral flow chamber 3 has the effect of promoting the spiral flow of gas containing a high concentration of particulate material in the vicinity of the inner wall surface of the cylindrical member 2, without disturbing the spiral flow of gas in the spiral flow chamber 3. The material-free gas is introduced into the spiral flow chamber 3 through the center of the end wall 6, pressure in the center of the end wall 6 being lower than pressure in the opening 11, so that the induction blower 41 can be dispensed with when the material collecting means 40 has a relatively low pressure loss.

Still another embodiment is shown in a front view in FIG. 7 and in a right side view in FIG. 8. Parts similar to those shown in FIGS. 1 to 4 are designated by like reference characters. In this embodiment which is similar to the embodiment shown in FIGS. 5 and 6, it is to be noted that the material-free gas from the material collecting means 40 is introduced into the spiral flow chamber 3 by the induction blower 41 through a duct 1a connected to the chamber 3 tangentially to its inner circumferential surface in the vicinity of the connection between the inlet duct 1 and the cylindrical member 2. The provision of the duct 1a enables the speed of spiral flow in the spiral flow chamber 3 to be increased. The port through which the material-free gas is introduced into the spiral flow chamber 3 has a lower pressure than the opening 11, so that the induction blower 41 can be dispensed with when the material collecting means 40 has a relatively low pressure loss.

FIG. 9 is a front view of still another embodiment wherein parts similar to those shown in FIGS. 1-4 are designated by like reference characters. What is noteworthy in this embodiment is that clean gas from the material collecting means 40 is led to the outlet duct 5. This embodiment may be lower in the efficiency with which the particulate material is collected than the embodiments shown in FIGS. 5 and 6 and FIGS. 7 and 8. However, since the gas introduced into the cylindrical member 2 is reduced in volume, it is possible to reduce the sizes of the cylindrical member 2, inverted pyramidical member 8 and material collecting means 40 and to reduce the capacity of the induction blower 41.

Figure 10:
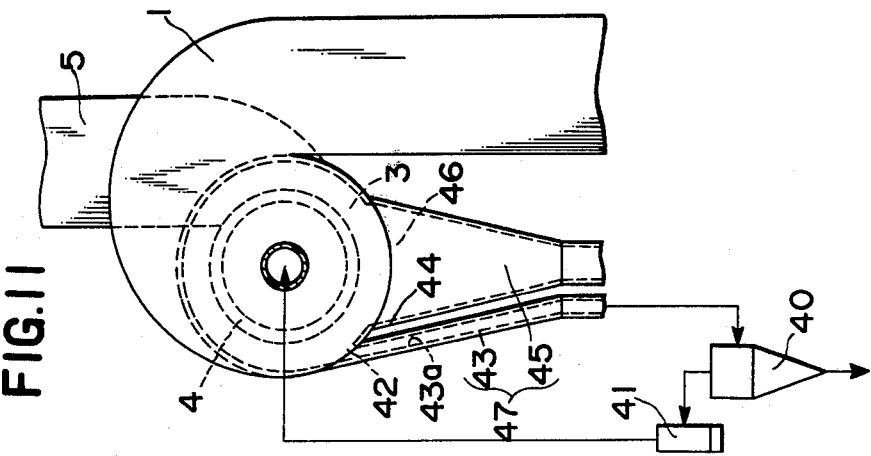
FIG. 10 is a schematic front view of the particulate material collecting apparatus comprising still another embodiment of the invention.
Figure 11:
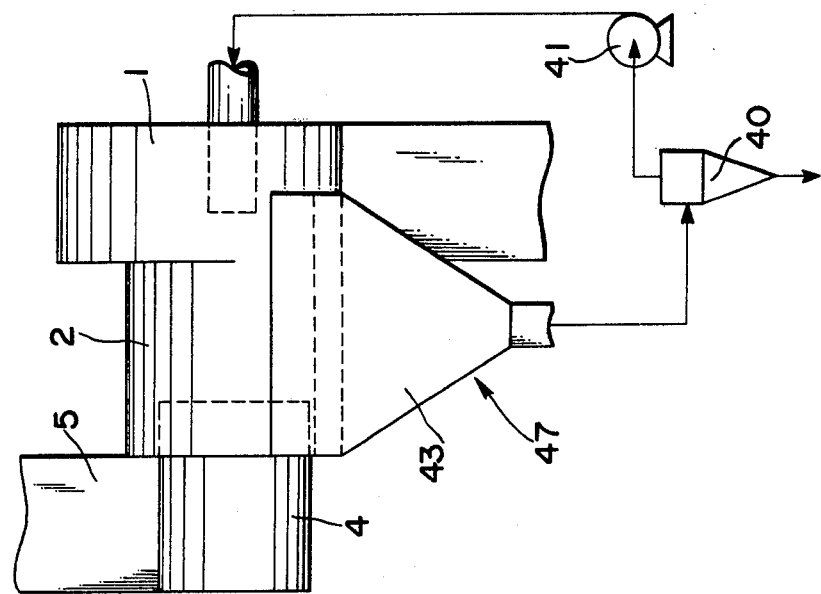
FIG. 11 is a side view of the apparatus as seen from the right in FIG. 10.

Still another embodiment is shown in a front view in FIG. 10 and a right side view in FIG. 11. Parts similar to those shown in FIGS. 1 to 4 are designated by like reference characters. In this embodiment, a material collecting means 47 is secured to the lower portion of the cylindrical member 2, in order to separate the material collecting space from the hollow inverted pyramidical member 8. The material collecting means 47 includes a material collecting duct 43 maintained in communication with the spiral flow chamber 3 through an opening 42 and a hopper 45 maintained in communication with an opening 46. The opening 46 is located relative to the opening 42 on the downstream side of the spiral flow of gas when the gas is introduced into the chamber 3 through the duct 1. The material collecting duct 43 has an inner wall portion 43a extending tangentially to the inner circumferential surface of the cylindrical member 2 and is converging downwardly. Connected to the lower end of the cylindrical member 2 adjacent to the opening 42 and spaced from the material collecting duct 43 by a spiral flow guide wall 44 is the hopper 45 which is disposed adjacent the material collecting duct 43. The absence of the spiral flow guide plate 10 between the spiral flow chamber 3 and the upper end of the hopper 45 enables large masses of particulate material to drop into the hopper 45 without any interference. The gas stream introduced into the spiral flow chamber 3 is passed in spiral flow along the inner wall surface of the cylindrical member 2 and the spiral flow guide wall 44. The gas containing a high concentration of particulate material in the vicinity of the inner wall surface of the cylindrical member 2 is drawn by the induction blower 41 through the material collecting duct 43 into the material collecting means 40. The gas drawn by the induction blower 41 may be about 10% of the total gas led into the spiral flow chamber 3 through the inlet duct 1. The gas from which the particulate material is removed is introduced into the cylindrical member 2 through the end thereof to which the inlet duct 1 is connected, to flow axially of the cylindrical member 2 toward the cylindrical portion 4.

FIG. 12 is a side view of still another embodiment, in which parts similar to those shown in FIGS. 1 and 11 are designated by like reference characters. In this embodiment, the gas drawn from the spiral flow chamber 3 through the material collecting duct 43 and having particulate material removed therefrom by the material collecting means 40 is introduced into the spiral flow chamber 3 in the vicinity of the connection between the inlet duct 1 and the cylindrical member 2, tangentially to the spiral gas flow in the chamber 3.

FIG. 13 is a front view of still another embodiment, wherein the cylindrical portion 4 shown in FIGS. 1 to 12 is eliminated and an outlet duct 66 is directly connected to an end of the cylindrical member opposite to the end to which the inlet duct 1 is connected and disposed coaxially with the cylindrical member 2. The outlet duct 66 which is smaller in diameter than the cylindrical member 2 has an end portion 66a projecting into the spiral flow chamber 3.

FIGS. 14 to 17 show still another embodiment and parts therein similar to those shown in FIGS. 1 to 13 are designated by like reference characters. At a lower end of the end wall 6 of the cylindrical member 2 a planar, inclined surface portion 6a inclined inwardly downwardly is formed. The angle of inclination $\alpha$ of the inclined end wall portion 6a with respect to the outer circumferential surface of the cylindrical member 2 is set at a value greater than the angle of repose or in the range between 45 and 55 degrees. The cylindrical portion 4 has a planar, inclined surface portion 4b at the lower end opposite to the end at which the cylindrical portion 4 is connected to the cylindrical member 2. The planar, inclined surface portion 4b inclines inwardly downwardly toward the cylindrical member 2 and has an angle of inclination $\beta$ with respect to the outer circumferential surface of the cylindrical member 2 like the planar, inclined surface portion 6a.

Figure 16:
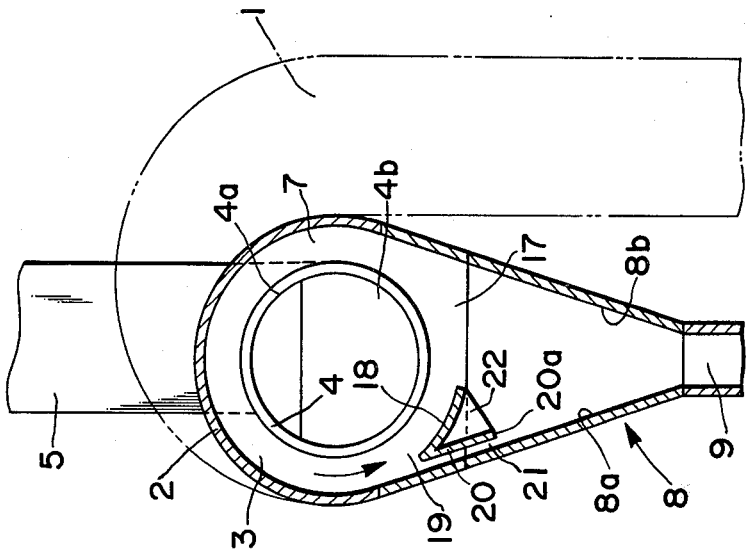
FIG. 16 is a schematic side view of the apparatus as seen from the right in FIG. 14.
Figure 17:
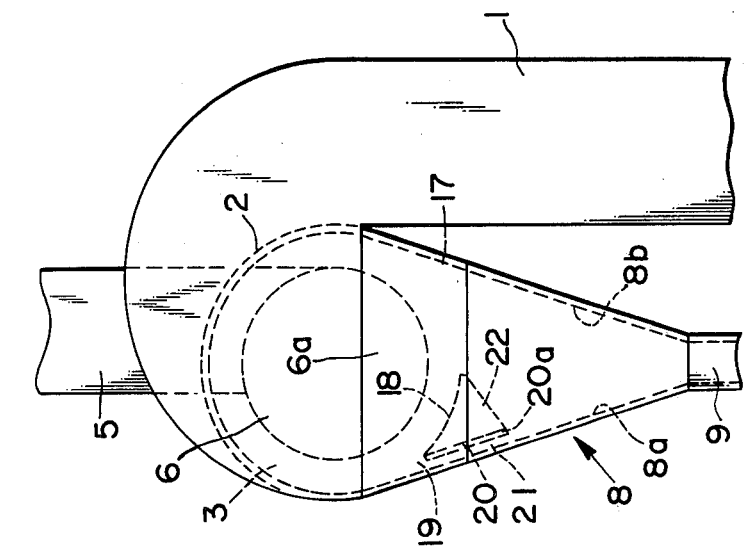
FIG. 17 is a schematic sectional view taken along the line XVII—XVII in FIG. 14.

The spiral flow guide plate 18 of this embodiment is shaped such that it is located near the boundary between the inverted pyramidical member 8 and the spiral flow chamber 3 to form the opening 19 on the upstream side of the spiral flow in the chamber 3 and an opening 17 on the downstream side thereof which is large enough to permit large masses of particulate material to drop therethrough as shown in FIGS. 15 to 17. The spiral flow guide plate 18 is curved to have the same curvature as the inner wall surface of the cylindrical member 2 and extends along the entire length of the cylindrical member 2.

In the inverted pyramidical member 8, the collected material guide plate 20 which is shorter than the collected material guide plate 13 shown in FIGS. 1 to 4 is connected at its upper end to the end of the spiral flow guide plate 18 which is near the opening 19 at the upstream side of the spiral flow. The collected material guide plate 20 is parallel to the inner wall portion 8a and extends obliquely downwardly to define a space between the plate 20 and inner wall portion 8a. The lower end 20a of the collected material guide plate 20 is disposed above the lower end of the inverted pyramidical member 8 in spaced apart relation. The spiral flow guide plate 18 and the collected material guide plate 20 are supported by a plurality of support plates 22 (three in number as shown) spaced apart from one another axially of the cylindrical member 2 and located at right angles to the center axis of the cylindrical member 2.

Figure 36:
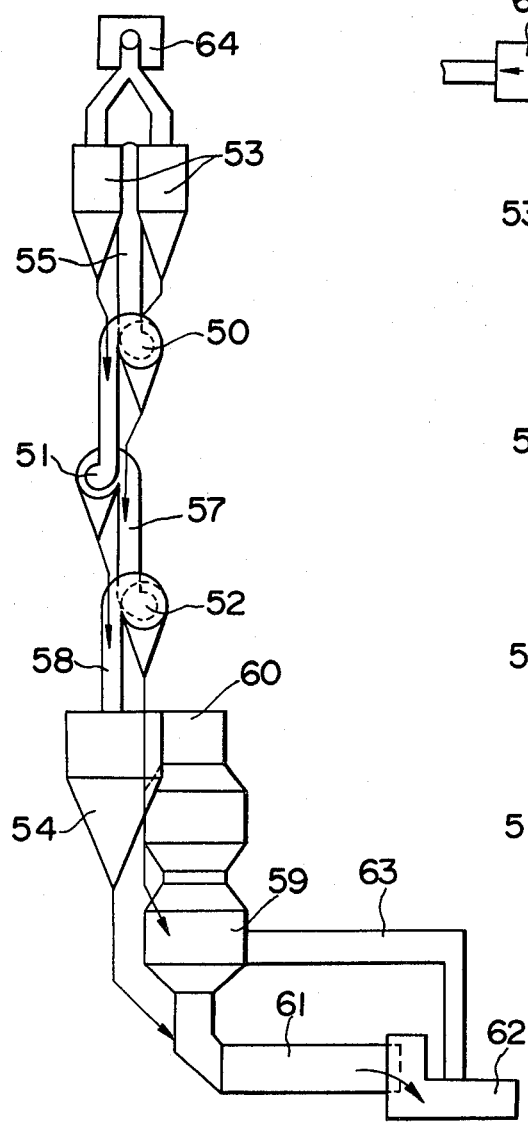
FIG. 36 is a schematic front view of a cement material firing system including a plurality of particulate material collecting apparatus according to the invention arranged in a plurality of stages.
Figure 37:
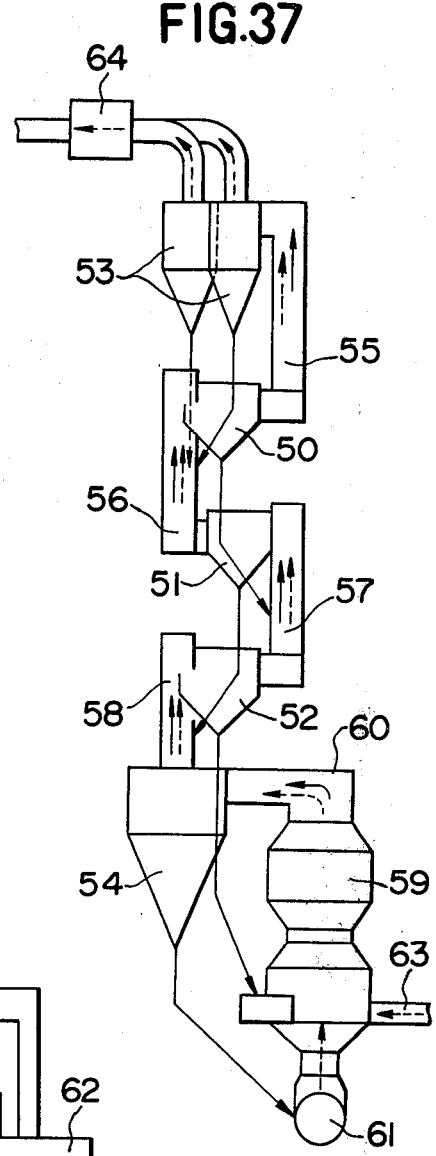
FIG. 37 is a schematic side view of the system shown in FIG. 36.

The provision of the planar, inclined surface portion 6a in the end wall 6 of the cylindrical member 2 prevents the particulate material from accumulating on the lower end portion of the wall 6. Thus an increase in pressure loss that might be caused by the deposition of particulate material can be avoided, and a reduction in material collecting efficiency that might be caused by the dispersion of the accumulated particulate material can also be avoided. As the planar, inclined surface portion 4b is provided in the end wall of the cylindrical portion 4. The particulate material introduced into the apparatus of the upper stage of a cement material firing system as shown in FIGS. 36 and 37, in which the particulate material collecting apparatus according to the invention are mounted to form a suspension preheater, moves downwardly through the outlet duct 5 and slides downwardly along the inclined end wall portion 4b into the inverted pyramidical member 8. Thus no accumulation of particulate material occurs in the cylindrical portion 4 and consequently a pressure loss can be avoided. As the spiral flow guide plate 18 has the opening 17 on the downstream side of the spiral flow for permitting of passing through of massive particulate materials, a large mass like a coating is prevented from accumulation on the spiral flow guide plate 18 and is moved easily downwardly into the inverted pyramidical member 8. The collected material guide plate 20 may be elongated downwardly as the material guide plate 13 shown in FIGS. 1-4.

FIG. 18 shows a modification of the embodiment shown in FIG. 17, and parts shown therein similar to those shown in FIG. 17 are designated by like reference characters. In this embodiment, the spiral flow guide plate 18 and the collected material guide plate 20 of the embodiments described hereinabove are replaced by a spiral flow and collected material guide plate 48 performing the functions of the two plates 18 and 20. The spiral flow and collected material guide plate 48 is located in a position intermediate between the positions of the plates 18 and 20 shown in FIGS. 14 and 17 and is curved radially outwardly of the spiral flow chamber 3. The plate 48 is supported by the inner wall portion 8a of the inverted pyramidical member 8 through support plates 49. The use of the spiral flow and collected material guide plate 48 enables the same results as achieved by the spiral flow guide plate and the collected material guide plate 20 shown in FIGS. 14 to 17.

FIG. 19 shows still another embodiment in a front view, and FIG. 20 shows this embodiment in a right side view. Parts similar to those shown in FIGS. 1 to 18 are designated by like reference characters. In this embodiment, the planar, inclined surface portion 6a of the end wall 6 of the cylindrical member 2 may be replaced by an inclined, convex-surface portion 6b which is curved outwardly. In this case, the inclined surface 6b is inclined downwardly at an angle of inclination α. Also, the planar, inclined surface portion 4b of the cylindrical portion 4 may also be replaced by an inclined, convex-surface portion 4c which is curved outwardly.

In still another embodiment, the inverted pyramidical member 8 may be arranged along the entire length of the cylindrical member 2 and connected to a vertical end wall of the cylindrical member.

Still another embodiment of the invention is shown in sectional view in FIG. 21. In FIG. 21 parts similar to those shown in FIGS. 1 to 4 are designated by like reference characters. In this embodiment a baffle plate 23 extending parallel to the axis of the cylindrical member 2 between the third and fourth inner wall portions 8c and 8d is secured to the second inner wall portion 8b in a manner to project from the second inner wall portion 8b obliquely downwardly into the space portion 16. The baffle plate 23 terminates at its lower end 23a disposed at higher level than the lower end 13a of the collected material guide plate 13. With this construction the particulate material remaining in the gas stream which has failed to be separated from the gas stream by the downwardly directed inertia of the downward gas flow in the material collecting space portion 14 impinges on the baffle plate 23, so that the upward flow of the particulate material in the space portion 16 is avoided, thereby increasing the efficiency with which the particulate material is collected. At the same time, the radius R of the gas stream changing its flow direction near the lower end 13a of the collected material guide plate 13 is reduced by the presence of the baffle plate 23. This increases the centrifugal force acting on the particulate material in the gas stream and promotes the drop of the particulate material.

FIG. 22 shows still another embodiment in a front view, and FIG. 23 is a sectional view taken along a line XXIII—XXIII in FIG. 22. In FIGS. 22 and 23, parts similar to those shown in FIGS. 1-4 are designated by like reference characters. As shown, a partition plate 24 disposed perpendicular to the center axis of the cylindrical member 2 is located between the first and second inner wall portions 8a and 8b in the central position within the inverted pyramidical member 8 disposed along the center axis of the cylindrical member 2. The partition plate 24 divides the material collecting space 14 defined by the first inner wall portion 8a and the collected material guide plate 13 into two space portions 14a and 14b. The space portions 16, which is defined by the collected material guide plate 13, the second, third and fourth inner wall portions 8b, 8c and 8d and the spiral flow guide plate 10, is divided into two space portions 16a and 16b by the partition plate 24. By dividing the interior of the inverted pyramidical member 8 in the central position disposed along the center axis of the cylindrical member 2 into two portions by the partition plate 24, it is possible to return the gas introduced into the space portion 14a through a portion of the opening 11 disposed near the inlet duct 1 into the spiral flow chamber 3 through the space portion 16a and through a portion of the opening 12 disposed near the inlet duct 1. It is also possible to return the gas introduced into the space portion 14b through a portion of the opening 11 disposed near the outlet duct 5 to the spiral flow chamber 3 through the space portion 16b and through a portion of the opening 12 disposed near the outlet duct 5. This is effective for prevention of shortcircuiting of the stream of gas containing particulate material in high concentration, which causes the gas to flow to the outlet duct 5, so that the stream of gas can be made to positively flow in spiral movement for a predetermined number of times or three times as described hereinabove within the spiral flow chamber 3 and the efficiency with which the particulate material is collected can be increased.

Both the baffle plate 23 and partition plate 24 may be provided in the inverted pyramidical member 8. When this is the case, synergistic effects can be achieved in increasing the efficiency with which the particulate material is collected as described hereinabove.

FIG. 24 shows still another embodiment wherein parts similar to those shown in FIGS. 1-4 are designated by like reference characters. In this embodiment, a spiral guide 25 in the form of a protrusion is provided in the interior of the cylindrical member 2 and oriented in the direction of a spiral flow of the gas stream, to thereby promote the spiral flow of the gas stream. The provision of the spiral guide 25 has the particular effect of avoiding a reduction in the force with which the gas stream flows in spiral movement in the rear end portion of the spiral flow chamber 3. Owing to the presence of the spiral guide 25, the particulate material forced by centrifugal forces to move toward the inner wall surface of the spiral flow chamber 3 can drop into the inverted pyramidical member 8 along the spiral guide 25, thereby preventing dispersion of the particulate material which might otherwise occur again.

Figure 43:
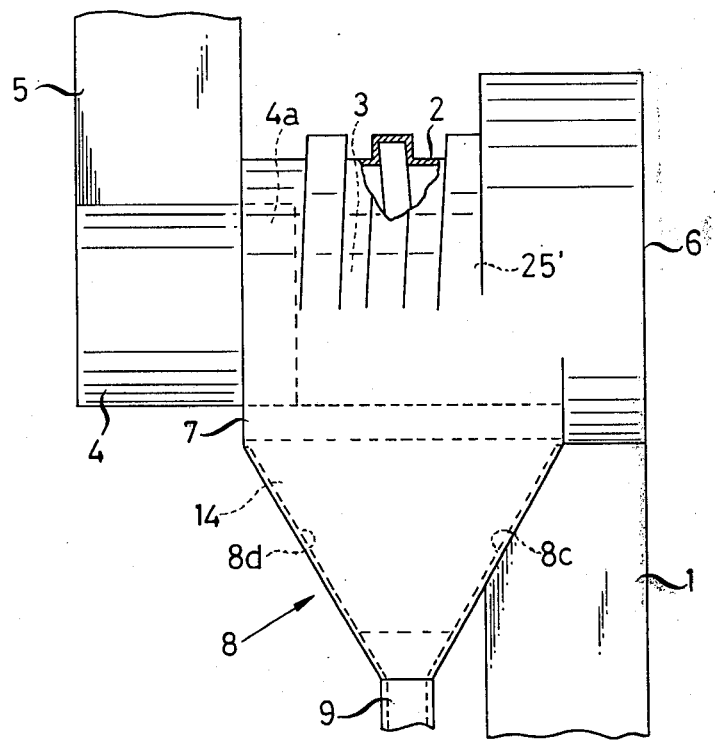
FIG. 43 is a schematic front view of the particulate material collecting apparatus showing modification of the apparatus of FIG. 24.

The spiral guide 25 formed as the protrusion may be replaced by a spirally arranged groove 25' formed on the inner surface of the spiral flow chamber 3, which is illustrated in FIG. 43. The spiral guide 25 may be in the form of a discontinuous spiral instead of a continuous spiral.

In another embodiment, a plurality of annular guide members 26 may be provided as shown in FIG. 25 in the interior of the cylindrical member 2 and secured to the inner wall surface thereof in a manner to be located in spaced relation axially of the cylindrical member 2. This embodiment can achieve the same effects as the embodiment shown in FIG. 24. The annular guide members 26 can serve concurrently as the support plate 22 shown in FIG. 14.

FIG. 26 is a front view of still another embodiment wherein parts similar to those shown in FIGS. 1-4 are designated by like reference characters. In this embodiment, the cylindrical member 2 of the embodiment shown in FIGS. 1-4 is replaced by a conical member 27 becoming smaller in diameter from the inlet duct 1 toward the outlet duct 5. By this arrangement, the gas stream introduced tangentially into the conical member 27 increases its force of spiral movement toward the outlet duct 5 side of the conical member 27, thereby increasing the efficiency with which the particulate material is collected.

FIG. 27 is a sectional view of still another embodiment wherein parts similar to those shown in FIGS. 14-17 are designated by like reference characters. This embodiment is similar to that shown in FIGS. 14-17 except that the cylindrical member 2 is replaced by a cylindrical member 28 which is constructed such that a downstream portion 28a as seen in the direction of a spiral flow therein has a larger radius of curvature R1 than the radius of curvature R2 of an upstream portion 28b. By this constructional feature, the gas stream introduced into the cylindrical member 28 flows spirally to a satisfactory degree even if the spiral flow guide plate 18 is relatively small in length, thereby avoiding collision of the gas stream against the second inner wall portion 8b of the inverted pyramidical member 8 and ensuring smooth spiral flow of the gas stream. The "cylindrical member of a circular cross section" includes the cylindrical member 28 of the aforesaid construction. The spiral flow chamber 3 may be polygonal in cross section so long as this cross sectional shape does not interfere with the spiral flow of the gas stream.

FIG. 28 is a sectional view of still another embodiment wherein parts similar to those shown in FIGS. 1-4 are designated by like reference characters. In this embodiment, the spiral flow guide plate 10 is formed with an opening 29, disposed immediately below the center axis of the cylindrical member 2, which extends axially of the cylindrical member 2 and allows communication between the spiral flow chamber 3 and the space portion 16. The provision of the opening 29 enables large masses of the particulate material contained in the gas stream to move downwardly into the space portion 16. A portion 10a of the spiral flow guide plate 10 is interposed between the openings 11 and 29, so that the occurrence of a turbulent flow in the spiral flow chamber 3 can be minimized.

FIG. 29 is a sectional view of still another embodiment wherein parts similar to those shown in FIGS. 14-17 are designated by like reference characters. An opening 30 is formed on the downstream side of the spiral flow guide plate 18 of the embodiment shown in FIGS. 14-17 as viewed in the direction of the spiral flow, and a second spiral flow guide plate 31 of the same radius of curvature as the spiral flow guide plate 18 is provided. The opening 30 is dimentioned such that large masses of the particulate material contained in the gas stream can move downwardly therethrough into the space portion 16.

FIG. 30 is a front view of still another embodiment wherein parts similar to those shown in FIGS. 1-4 are designated by like reference characters. When the inlet duct 1 is connected to the cylindrical member 2 in such a manner that the side wall of the inlet duct 1 is offset with respect to the side wall of the cylindrical member 2, the particulate material in the gas stream introduced into the cylindrical member tangentially to the cylindrical member 2 through the inlet duct 1 is biased toward an offset portion 32. Thus as the gas stream flows in spiral flow toward the outlet duct 5, a high concentration portion of the particulate material is formed spirally in the cylindrical member 2. To cope with this situation, movable closure plates 33 are provided in the openings 11 on the upstream side of the spiral flow of gas stream in such a manner that the closure plates 33 are spaced apart from one another and movable axially of the cylindrical member 2. By this structural feature, a small volume of gas containing the particulate material in high concentration can be led through the opening 11 into the material collecting space 14 if the closure plates 33 are fixed in place in a portion of the cylindrical member 2 of low particulate material concentration. This permits the particulate material to be collected with a high degree of efficiency.

FIGS. 31(A), 31(B), 31(C) and 31(D) are side views of modifications of the embodiment shown in FIG. 3. Parts in these figures similar to those shown in FIGS. 1-4 are designated by like reference characters. The inlet duct 1 of the embodiment shown in FIG. 3 may be connected to the cylindrical member as shown in FIGS. 31(A)-31(C). Also, in place of the so-called linden type connection described hereinabove, a connection may be adopted in which a side wall portion 1a of the inlet duct 1 is in alignment with a line tangent to the outer circumference of the cylindrical member 2. The term "tangential direction" includes such connection.

Figure 34:
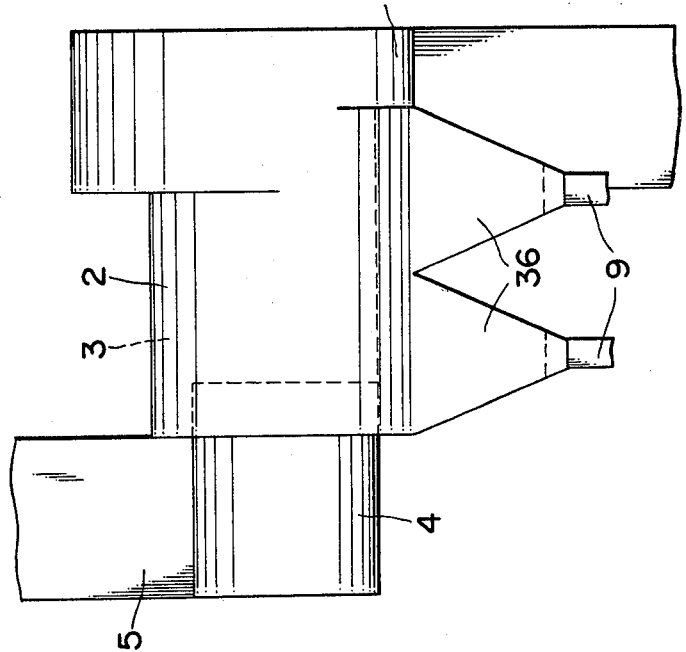
FIG. 34 is a schematic front view of the particulate material collecting apparatus comprising still another embodiment of the invention.

FIG. 32 is a front view of still another embodiment wherein parts similar to those shown in FIGS. 1-4 are designated by like reference characters. In this embodiment, the inverted pyramidical member 8 shown in FIGS. 1–4 is replaced by a member 34 in which the material collecting cylinder 9 is displaced leftwardly in FIG. 32 to a position aligned vertically with the left end of the center axis of the cylindrical member 2. Also, the inverted pyramidical member 8 may be replaced by a member 35 shown in FIG. 33 in which the material collecting cylinder 9 is displaced sideways to one side of the cylindrical member 2 so that the member 35 is disposed at right angles to the center axis of the cylindrical member 2. Also, as shown in FIGS. 34, a plurality of inverted pyramidical members 36 (two in number as shown) may be arranged axially of the cylindrical member 2. This construction is preferable when the number of spiral movements of the gas stream is increased by increasing the length of the spiral flow chamber 3 and it is desired to reduce the overall height of the apparatus.

Figure 35:
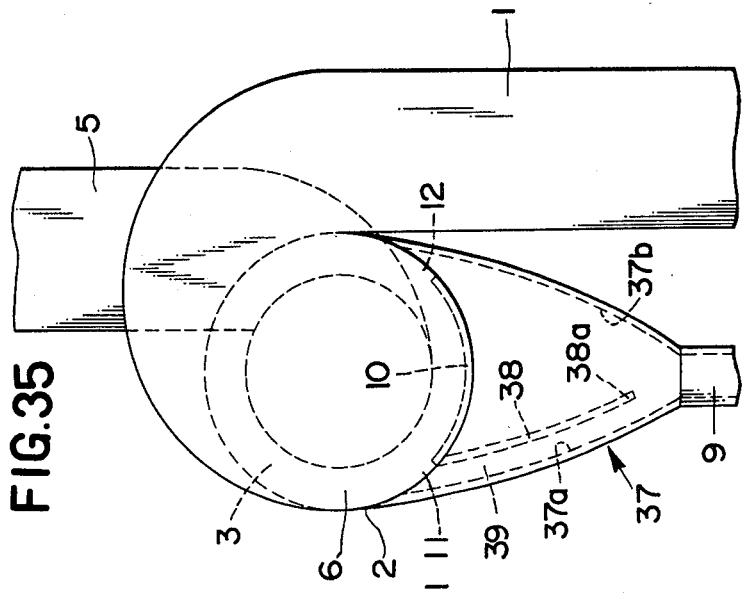
FIG. 35 is a schematic side view of the particulate material collecting apparatus comprising still another embodiment of the invention.

FIG. 35 is a side view of still another embodiment in which parts similar to those shown in FIGS. 1–4 are designated by like reference characters. In this embodiment, the inverted pyramidical member 8 of the embodiment shown in FIGS. 1–4 is replaced by a member 37 secured to the lower end of the cylindrical member 2. The member 37 includes inner wall portions 37a and 37b which are curved outwardly. A collected material guide plate 38 also curved outwardly is arranged to define an outwardly curved space 39 between the plate 38 and the outwardly curved inner wall portion 37a. By this structural feature, centrifugal forces act on the gas stream introduced into the space 39 from the spiral flow chamber 3 through the opening 11, to bias the particulate material contained in the gas stream toward the inner wall portion 37a. This reduces the amount of particulate material entrained in an upwardly directed gas stream flowing within the member 37 after changing its direction at a lower end 38a of the collected material guide plate 38, thereby increasing the efficiency with which the particulate material is collected.

FIG. 36 is a front view of a cement material firing system wherein a plurality of particulate material collecting apparatus according to the invention are incorporated in a plurality of stages, and FIG. 37 is a side view thereof. Together with uppermost cyclones 53 and a lowermost cyclone 54, the particulate material collecting apparatus 50, 51 and 52 constitute suspension preheaters. After being supplied through a duct 55, particulate material is blown from below by heated gas so that heat exchange takes place between the particulate material and gas. As indicated by arrows, the particulate material is then collected in the cyclones 53 and flows downwardly into a duct 56. Repeating this process, the particulate material moves through duct 56 particulate material collecting apparatus 50, duct 57, particulate material collecting apparatus 51, duct 58, and particulate material collecting apparatus 52 to a calcining furnace 59 where the particulate material is subjected to decarbonation.

The particulate material calcined in the calcining furnace 59 is led through a duct 60 to the cyclone 54 where it is collected and sent to a rotary kiln 61. In the rotary kiln, the particulate material is fired into clinker which is cooled in a clinker cooler 62 to be turned into an end product.

The path of flow of the heated gas is indicated by broken-line arrows. The exhaust gas of high temperature from the rotary kiln 61 is introduced into the calcining furnace 59 together with secondary air of elevated temperature for combustion extracted from the clinker cooler 62 through duct 63. The heated gas from the calcining furnace 59 is passed through the duct 60, cyclone 54, duct 58, particulate material collecting apparatus 52, duct 57, particulate material collecting apparatus 51, duct 56, particulate material collecting apparatus 50, duct 55, and cyclones 53 and subjected to heat exchange with the particulate material. After effecting heat exchange, the gas is exhausted by an induction blower 64.

The particulate material collecting apparatus 50, 51 and 52 are smaller in size than cyclones of the prior art as described hereinabove. Because of this, even if the apparatus are used to constitute a suspension preheater in five stages (53, 50, 51, 52 and 54) as shown, the overall height is equal to a suspension preheater consisting entirely of cyclones of the prior art arranged in four stages. It goes without saying that heat exchange can be effected with increased efficiency, and the power of the induction blower 64 can be reduced because of reduced power loss of the particulate material collecting apparatus 50, 51 and 52, when the suspension preheater is arranged in five stages as compared with a suspension preheater arranged in four stages.

By arranging another material collecting apparatus according to the present invention, the material collecting apparatus 50, 51 and 52 and other one or more material collecting apparatuses constitute a suspension preheater together with the uppermost stage cyclone 53 and the lowermost stage cyclone 54 in multiple stages. It goes without saying that heat exchange can be effected with increased efficiency, and can be constructed in overall height equal to a suspension preheater consisting entirely of cyclones of the prior art arranged in four stages.

Figure 38:
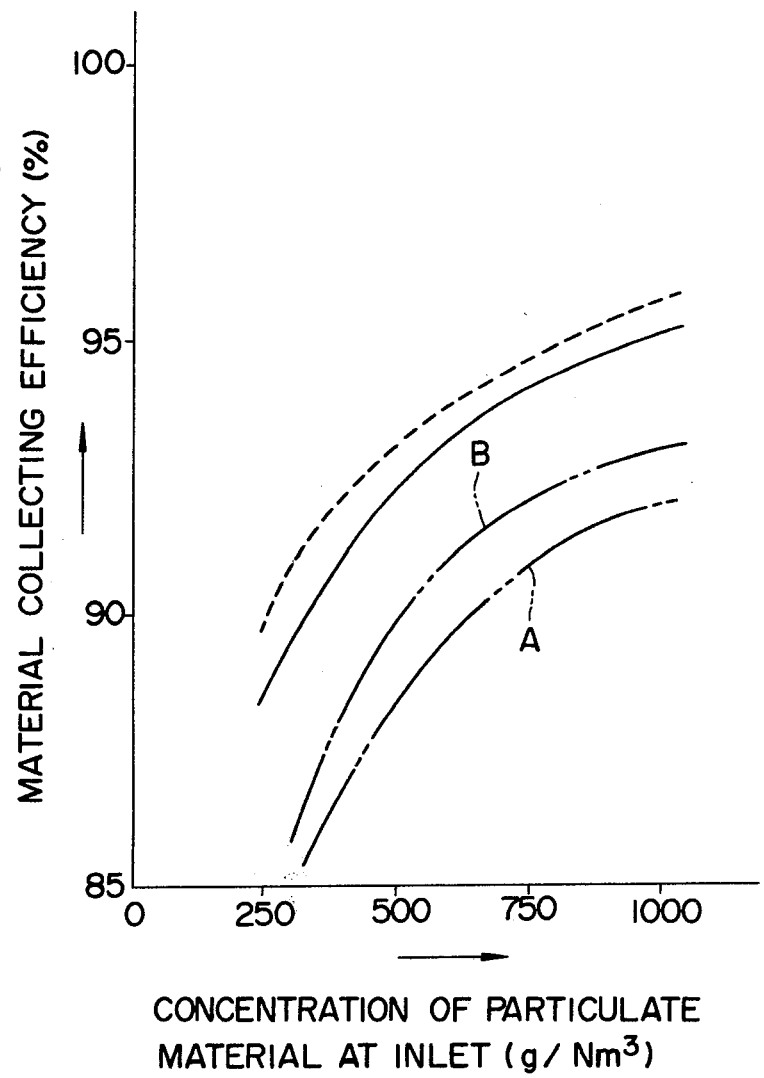
FIGS. 38, 39, 40, 41 and 42 are graphs showing the results of experiments conducted on the embodiment shown in FIGS. 14 to 17.
Figure 39:
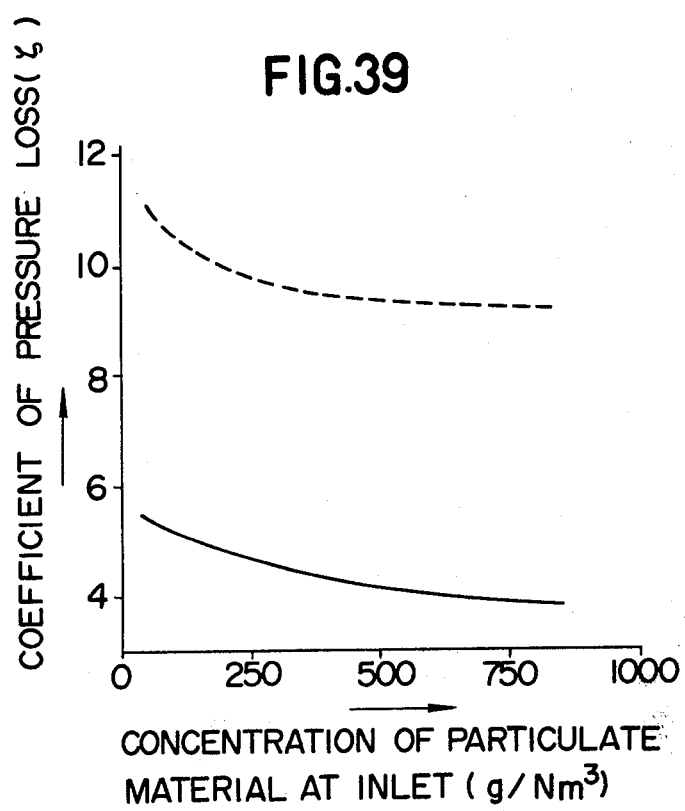

FIGS. 38 and 39 show the results of experiments carried out on the particulate material collecting apparatus shown in FIGS. 14 to 17. In the figures, a solid line curve represents a result obtained with the apparatus according to the present invention and a broken line curve represents a result obtained with a cyclone of the prior art used as a comparison. In FIG. 38, dash-and-dot line curves show, for reference, results obtained with (A) an apparatus having no inclined surface portion 6a in the lower end portion of an end wall of the cylindrical member 2 and no spiral flow guide plate 18 and no collected material guide plate 20 and (B) an apparatus having the inclined surface portion 6a but having no spiral flow guide plate 18 and no collected material guide plate 20. In FIG. 38, it will be seen that the provision of the inclined surface portion 6a in the end wall 6 of the cylindrical member 2 and the provision of the spiral flow guide plate 18 and the collected material guide plate 20 in the upper and middle portions respectively of the inverted pyramidical member 8 has the effect of increasing the material collecting efficiency of the particulate material collecting apparatus according to the invertion to a level almost equal to that of a cyclone of the prior art. Namely, reference is especially made to the solid line curve showing the apparatus of the present invention in FIGS. 14–17 and the curve (A) showing the apparatus without the inclined surface portion, the spiral flow guide plate and the collected material guide plate. Since the apparatus of the present invention is provided with the inclined surface portion 6a, the spiral flow guide plate 18 and the material guide plate 20, the material collecting efficiency is improved up to the level almost same as that of the cyclone, within 1%.

On the other hand, the pressure loss Δp of a particulate material collecting apparatus can be generally expressed by the following equation:

$$\Delta P = \zeta \cdot \frac{\gamma \cdot v^2}{2g} \quad (1)$$

where
- ζ: coefficient of pressure loss.
- γ: specific gravity of gas.
- v: velocity at which gas is blown into the apparatus.
- g: gravitational acceleration.

From equation (1), it will be seen that the larger the coefficient of pressure loss ζ, the greater is the pressure loss Δp under the condition that the specific gravity of gas γ and the velocity at which gas is blown into the apparatus v are maintained constant. FIG. 39 shows that the coefficient of pressure loss ζ is markedly lower in the apparatus according to the invention (a solid line) than a cyclone of the prior art (a broken line). From this, it can be concluded that the pressure loss Δp is lower in the apparatus according to the invention than in a cyclone of the prior art.

Accordingly, when the collecting apparatus of the present invention is used in the cement industry as shown in FIGS. 36 and 37, the material collecting efficiency is almost the same as it would be using prior art cyclones, but the pressure loss in operating the system is less than half of that of the prior art cyclones. Consequently, energy efficiency of the system is significantly improved in total.

In practice, when the apparatus is used in the system as shown in FIGS. 36 and 37, the mean diameter of the particles to be collected is 50 μm, including particles less than 10 μm, for example, cement material, alumina powder and the like, and the particle suspension in the gas is at about 900° C. and of a density of 1.2–1.8 kg/Nm³. For the collection of particles from such a suspension, it is preferable to make the apparatus of hereinafter specified dimensions to further improve the collecting efficiency and decrease the pressure loss.

Figure 40:
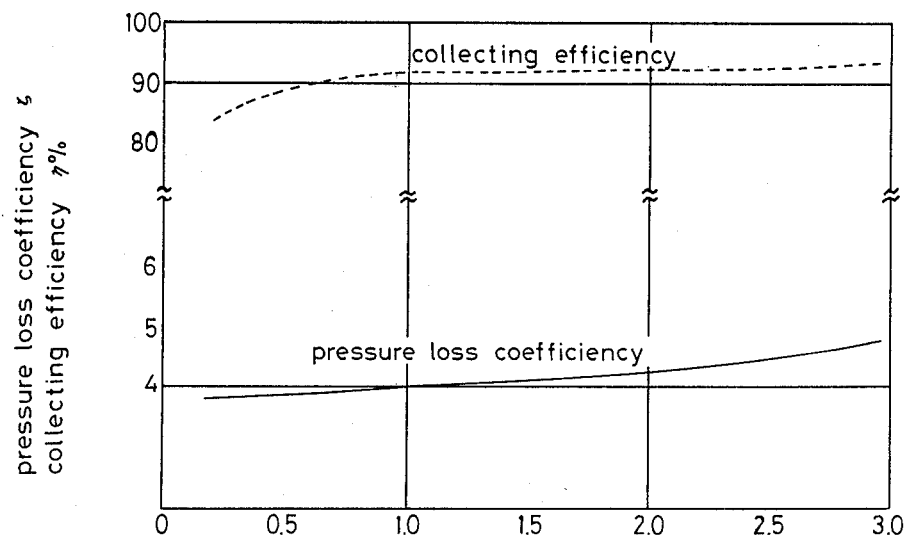
Figure 41:
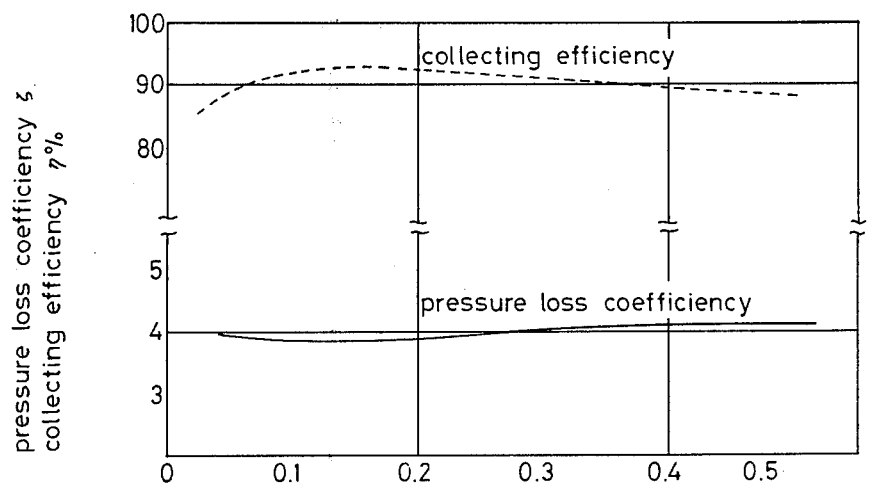
Figure 42:
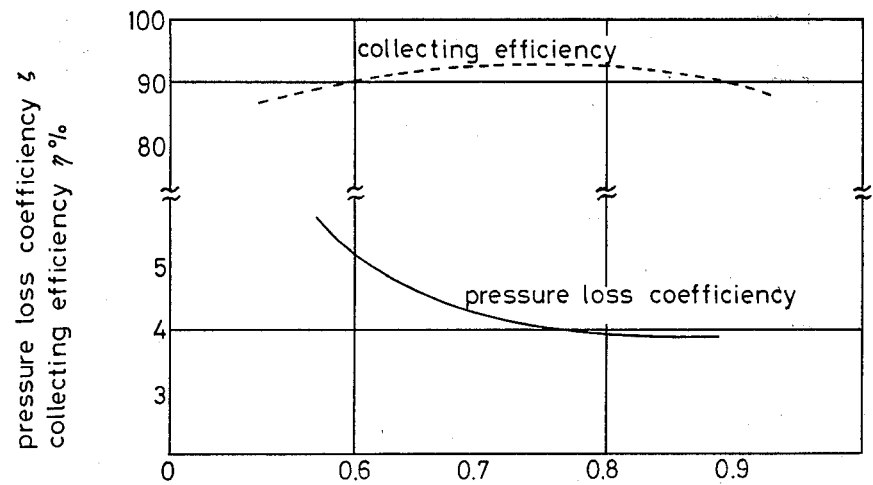

FIGS. 40, 41 and 42 show relationships of both pressure loss coefficient and collecting efficiency to ratios of dimensions of specific parts of the apparatus of the present invention.

In FIG. 40, the relation between the ratio of the length of the spiral flow chamber to the inner diameter thereof and the collecting efficiency and pressure loss coefficient is disclosed, in which when the ratio of the length to the inner diameter is between 0.8–2.0, the pressure loss coefficient is relatively low. Namely, a mixture of the particulate with the gas is spirally circulated around the horizontal axis of the spiral flow chamber to smoothly and perfectly separate the particulate from the gas and is exhausted through the outlet duct 5, wherein the gas drawn into the spiral flow chamber is neither agitated nor mixed again with the separated particulate. It is to be noted that if the value of the ratio is small, the collecting efficiency becomes lower, and if the value is large, the pressure loss increases with the length of the chamber.

FIG. 42 shows the relation between the ratio of the inner diameter of the end portion of the cylindrical portion 4 to that of the spiral flow chamber 3 and the collecting efficiency and pressure loss coefficient, in which when the ratio is between 0.7–0.8, the pressure loss coefficient can be maintained relatively low. In the present invention, the particulate in the gas can be almost completely separated from the gas while passing through the spiral flow chamber 3, so that a value in the above range can be selected. If the ratio is below 0.7, the pressure loss coefficient becomes high, and if the ratio is above the range, the collecting efficiency decreases.

In FIG. 41, there is shown the relation between the ratio of the length of the portion 4 projecting into the spiral flow chamber 3 to the inner diameter of the spiral flow chamber 3 and the collecting efficiency and pressure loss coefficient. The ratio of the projecting portion to the inner diameter is selected between 0.1–0.2. In case the ratio is higher than the above range, the gas contains the particulate in high density due to insufficient separation flow into the outlet duct to decrease the collecting efficiency, and two kinds of vortexes are generated in the chamber 3 to thereby increase the pressure loss. On the contrary, in case the ratio is lower than the aforementioned range, a part of the particulate is exhausted together with the purified gas through the outlet duct to thereby decrease the collecting efficiency.

From the foregoing description, it will be appreciated that according to the present invention, there is provided a particulate material collecting apparatus comprising a cylindrical member defining therein a spiral flow chamber having a horizontal center axis and circular or polygonal with the number of corners suitable for not disturbing the spiral gas flow in cross section and means for introducing gas tangentially to the spiral flow chamber to permit a gas stream to flow in spiral flow in the spiral flow chamber while passing axially of the chamber. By this arrangement, interference of two types of vortical flows with each other occurring in a cyclone can be avoided to thereby minimize a loss of pressure. In the particulate material collecting apparatus according to the invention, a hollow inverted pyramidical member is connected to the lower portion of the cylindrical member to separate particulate material from the gas stream, and the particulate material contained in the gas stream is forcedly introduced into the material collecting space formed in the pyramidical member by the collected material guide plate defining an opening located at the upstream side of the spiral flow. This makes it possible to reduce the size of the particulate material collecting apparatus as compared with a cyclone of the prior art wherein particulate material is caused to drop freely by gravity. The gas stream having contained therein the particulate material of high concentration is introduced from the opening located at the upstream side of the spiral flow into the material collecting space in which the gas flow speed is increased downwardly, so that the particulate material drops acceleratedly by virtue of downward inertia into the material collecting cylinder and is collected with a high degree of efficiency.

While the invention is described with reference to the specific embodiments, it is to be noted that the description is illustrative and the invention is limited only by the appended claims.

What is claimed is:

1. A particulate material collecting apparatus comprising:
 a cylindrical member defining therein a spiral flow chamber having a horizontal center axis, said spiral flow chamber having a horizontal length of about 0.8–2.0 times the inner diameter of the spiral flow chamber;

an inlet duct connected to one end of said cylindrical member tangentially to the inner circumferential surface of the cylindrical member;

an outlet duct connected to the other end of said cylindrical member and having a cylindrical portion projecting into the spiral flow chamber coaxially therewith, said cylindrical portion projecting a length of about 0.1–0.2 times the inner diameter of the spiral flow chamber and having a diameter of about 0.7–0.8 times the inner diameter of the spiral flow chamber;

a hollow inverted pyramidical member connected to the lower portion of said cylindrical member including walls converging downwardly;

a spiral flow guide plate located near the boundary between said cylindrical member and said hollow inverted pyramidical member so as to define two openings, said openings substantially extending along the entire length of the cylindrical member parallel to the horizontal center axis thereof, one of said openings being disposed closer to the inlet duct than the other opening as measured along a spiral line following the configuration of the spiral flow chamber from the inlet duct to the outlet duct so that the openings are respectively located at the upstream and downstream sides of spiral flow of gas in said spiral flow chamber when the gas is first introduced thereinto through the inlet duct; and a collected material guide plate mounted in the hollow inverted pyramidical member to define a material collecting space communicating with said one opening located at the upstream side of the spiral flow of gas.

2. A particulate material collecting apparatus as claimed in claim 1, wherein said outlet duct extends tangentially to the inner circumferential surface of said cylindrical portion thereof.

3. A particulate material collecting apparatus as claimed in claim 1, wherein said spiral flow guide plate has a convex surface curved radially outwardly of said cylindrical member.

4. A particulate material collecting apparatus as claimed in claim 3, wherein said spiral flow guide plate has the same curvature as the inner circumferential surface of said cylindrical member.

5. A particulate material collecting apparatus as claimed in claim 3, wherein said spiral flow guide plate is arranged in an inclined position oriented into the interior of the inverted pyramidical member between the outer periphery of the spiral flow chamber and the upper end of the inverted pyramidical member.

6. A particulate material collecting apparatus as claimed in claim 1, further comrpising at least one partition plate mounted in said inverted pyramidical member perpendicularly to the center axis of said cylindrical member, to divide the inverted pyramidical member into a plurality of spaces.

7. A particulate material collecting apparatus as claimed in claim 1, wherein said collected material guide plate terminates at a lower end spaced apart from the lower end of said inverted pyramidical member.

8. A particulate material collecting apparatus as claimed in claim 1, further comprising a baffle plate projecting inwardly downwardly from an inner wall portion of the inverted pyramidical member toward said collected material guide plate located opposite the baffle plate to further define said material collecting space.

9. A particulate material collecting apparatus as claimed in claim 1, wherein said cylindrical member includes an inclined surface portion formed at the lower end portion of an end wall thereof at which said inlet duct is connected to the cylindrical member, said inclined surface portion being inclined inwardly downwardly and connected to said inverted pyramidical member.

10. A particulate material collecting apparatus as claimed in claim 9, wherein said inclined surface portion formed at the lower end portion of an end wall of said cylindrical member is planar in shape.

11. A particulate material collecting apparatus as claimed in claim 9, wherein said inclined surface portion formed at the lower end portion of an end wall of said cylindrical member is in the shape of a convex surface curved outwardly.

12. A particulate material collecting apparatus as claimed in claim 1, wherein said cylindrical portion of said outlet duct includes an inclined surface portion formed at a lower end portion of an end wall of the cylindrical portion, said inclined surface portion being inclined toward said cylindrical member so that the inclined surface portion is disposed immediately below the outlet duct.

13. A particulate material collecting apparatus as claimed in claim 1, wherein a spiral guide in the form of protrusion is provided in the interior of the spiral flow chamber for promoting the spiral movement of the gas stream.

14. A particulate material collecting apparatus as claimed in claim 1, wherein a spiral guide in the form of a groove is provided in the interior of the spiral flow chamber for promoting the spiral movement of the gas stream.

15. A particulate material collecting apparatus as claimed in claim 1, further comprising movable closure plates provided in the opening located closer to the inlet duct, said closure plates being spaced apart from one another in the axial direction of the cylindrical member and movable axially of the cylindrical member.

16. A particulate material collecting apparatus as claimed in claim 1, further comprising material collecting means connected to a lower end of said inverted pyramidical member to separate material from the gas introduced into the inverted pyramidical member.

17. A particulate material collecting apparatus as claimed in claim 16, further comprising an induction blower located between and communicating with said material collecting means and said cylindrical member so as to cause the gas in the pyramidical member to flow into the collecting means and to transfer the gas to said cylindrical member from a side at which said inlet duct is connected after the material is removed from the gas at the material collecting means.

18. A particulate material collecting apparatus as claimed in claim 17, wherein said induction blower is connected to said cylindrical chamber so that the material-free gas is introduced into said cylindrical member tangentially to the inner circumferential surface thereof.

19. A particulate material collecting apparatus as claimed in claim 16, further comprising an induction blower located between and communicating with said material collecting means and said outlet duct so as to cause the gas in the pyramidical member to flow into the collecting means and to transfer the gas to the outlet duct after the material is removed from the gas at said material collecting means.

20. A particulate material collecting apparatus as claimed in claim 1, further comprising material collecting means connected to a lower end of the material collecting space, and an induction blower located between and communicating with said material collecting means and said cylindrical member so as to cause the gas to flow into the collecting means and to transfer the gas to said cylindrical member from a side at which said inlet duct is connected after material is removed from the gas at the material collecting means.

* * * * *